(12) United States Patent
Anderson et al.

(10) Patent No.: US 9,749,164 B2
(45) Date of Patent: Aug. 29, 2017

(54) ASYNCHRONOUS DIGITAL COMMUNICATION

(71) Applicant: MASSACHUSETTS INSTITUTE OF TECHNOLOGY, Cambridge, MA (US)

(72) Inventors: Grant Seaman Anderson, Salt Lake City, UT (US); Charles Giona Sodini, Belmont, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 0 days.

(21) Appl. No.: 15/327,352

(22) PCT Filed: Jul. 23, 2015

(86) PCT No.: PCT/US2015/041829
§ 371 (c)(1),
(2) Date: Jan. 18, 2017

(87) PCT Pub. No.: WO2013/014853
PCT Pub. Date: Jan. 28, 2016

(65) Prior Publication Data
US 2017/0171000 A1    Jun. 15, 2017

Related U.S. Application Data

(60) Provisional application No. 62/027,846, filed on Jul. 23, 2014.

(51) Int. Cl.
*H04L 25/49* (2006.01)
*H04W 4/00* (2009.01)

(52) U.S. Cl.
CPC ......... *H04L 25/4904* (2013.01); *H04W 4/008* (2013.01)

(58) Field of Classification Search
CPC .......................... H04L 25/4904; H04W 4/008
See application file for complete search history.

(56) References Cited

U.S. PATENT DOCUMENTS

| 5,696,507 | A | 12/1997 | Nam | |
| 6,408,037 | B1 | 6/2002 | Gienger | |
| 7,573,956 | B2 * | 8/2009 | Lazar | H03M 1/125 341/110 |

(Continued)

OTHER PUBLICATIONS

Rosner, "A High Speed Wearable System for Body Coupled Communication," Aug. 18, 2014, Unpublished Thesis: Massachusetts Institute of Technology, Department of Electrical Engineering and Computer Science.

(Continued)

*Primary Examiner* — Kenneth Lam
(74) *Attorney, Agent, or Firm* — Cooley LLP

(57) ABSTRACT

Systems, apparatus, and methods of asynchronous digital communication include at least one transmitter and/or at least one receiver communicatively coupleable to at least one communication interface for encoding and transmitting digital information as and/or receiving and decoding digital information from a transition between a first symbol and a second symbol, based on a predetermined relationship between the first symbol and the second symbol in such a way that the timing of the symbols is no longer relevant.

20 Claims, 19 Drawing Sheets

(56) References Cited

U.S. PATENT DOCUMENTS

| | | | |
|---|---|---|---|
| 9,014,216 B2* | 4/2015 | Lazar | A61B 5/0002 370/521 |
| 9,075,446 B2* | 7/2015 | Garudadri | H03M 7/30 |
| 2002/0075811 A1* | 6/2002 | Lee | H04L 1/0009 370/252 |
| 2009/0262717 A1 | 10/2009 | Sugaya | |
| 2012/0194372 A1 | 8/2012 | Venkatraman | |
| 2015/0230707 A1 | 8/2015 | Anderson et al. | |

OTHER PUBLICATIONS

Santagati et al., "Distributed MAC and Rate Adaption for Ultrasonically Networked Implanted Sensors", 2013 IEEE International Conference on Sensing, Communications and Networking (SECON), Feb. 6, 2013, Section IV.

* cited by examiner

ASYNCHRONOUS DIGITAL COMMUNICATION

CROSS-REFERENCE TO RELATED APPLICATIONS

This application is a national stage of and claims the benefit under 35 U.S.C. §371 of International Patent Application No. PCT/US15/41829, filed Jul. 23, 2015, entitled "Asynchronous Digital Communication," which in turns claims a priority benefit of U.S. Provisional Patent Application No. 62/027,846, filed Jul. 23, 2014, entitled "Asynchronous Digital Communication," the contents of both of which applications are incorporated herein by reference in their entirety.

TECHNICAL FIELD

The present disclosure relates generally to systems, apparatus, and methods for communicating information. More specifically, the present disclosure relates to systems and methods for encoding and decoding data for communicating information.

BACKGROUND

Communication technology uses channels to exchange information as electrical signals between two points or nodes. The two points or nodes may be, for example, integrated circuits on a circuit board, a cell phone and cell tower, two computers on a network, or a sensor and a base station. Digital information, such as a digital signal, can be encoded using various schemes. The encoded digital information may be sent by a transmitter-node across a medium, either via wires or wirelessly in the form of electromagnetic waves, to a receiver-node, thus enabling transmission of the encoded digital information between the two nodes. When the receiver-node receives the encoded digital information, it decodes the digital information. However, to decode the information the receiver-node currently must possess the correct value of the timing that was used to encode the original digital information.

Some encoding/decoding schemes require that the transmitter-node send the timing information, that is, a clock signal, alongside and independent of the encoded digital information. Other schemes embed the timing information within the encoded digital information. Yet other schemes rely on distributing and/or using highly accurate primary reference clocks using synchronization links and synchronization supply units. Due at least in part to clock synchronization requirements, communication functions can be one of the largest consumers of power for most devices.

SUMMARY

The present disclosure describes systems and methods of asynchronous digital communication to encode/decode digital information in such a way that the timing of the digital signal does not need to be constant, and does not need a "clock" to be decoded. The inventors have recognized and appreciated that coding information asynchronously saves power, chip area, and design time needed to include timing information in current schemes to encode/decode the digital information. This may be particularly useful in wearable, implantable, and attachable devices, in which communication functions dominate the power consumption of nodes, by alleviating the power budget by reducing the power needs associated with timing functions.

In one embodiment, a communication device for asynchronously receiving and decoding information includes at least one communication interface, at least one memory device for storing processor-executable instructions, and at least one processor communicatively coupled to the at least one communication interface and the at least one memory device. Upon execution of the processor-executable instructions by the at least one processor, the at least one processor controls the at least one communication interface to receive a first symbol, compares the first symbol to a predetermined plurality of symbols, and determines that, if the first symbol is included in the predetermined plurality symbols, the first symbol is valid. The at least one processor further controls the at least one communication interface to receive a second symbol, the second symbol being different from the first symbol, compares the second symbol to the predetermined plurality of symbols, determines that, if the second symbol is included in the predetermined plurality of symbols, the second symbol is valid, and decodes digital data based on a predetermined relationship between the first symbol and the second symbol.

In an embodiment, the device is a mobile computing device and/or a wearable computing device. The device may include a memory device for storing the decoded digital data and/or a transmitter for transmitting the decoded digital data to a computing device.

In one embodiment, a method for asynchronously receiving and decoding information includes receiving, via at least one communication interface, a first symbol, comparing, via at least one processor, the first symbol to a predetermined plurality of symbols, and determining that, if the first symbol is included in the predetermined plurality symbols, the first symbol is valid. The method also includes receiving, via the at least one communication interface, a second symbol, the second symbol being different from the first symbol, comparing, via the at least one processor, the second symbol to the predetermined plurality of symbols, determining that, if the second symbol is included in the predetermined plurality of symbols, the second symbol is valid, and decoding, via the at least one processor, digital data based on a predetermined relationship between the first symbol and the second symbol.

In an embodiment, the method further includes storing the decoded digital data in a memory device and/or transmitting the decoded digital data to a computing device.

In one embodiment, a communication device for asynchronously encoding and transmitting information includes at least one communication interface, at least one memory device for storing processor-executable instructions, and at least one processor communicatively coupled to the at least one communication interface and the at least one memory device. Upon execution of the processor-executable instructions by the at least one processor, the at least one processor controls the at least one communication interface to transmit a first symbol from a predetermined plurality of symbols, selects a second symbol from the predetermined plurality of symbols, the second symbol being different from the first symbol, to encode digital data based on a predetermined relationship between the first symbol and the second symbol, and controls the at least one communication interface to transmit the second symbol from the predetermined plurality of symbols thereby encoding the digital data.

In an embodiment, the device is a mobile computing device and/or a wearable computing device. The digital data may be associated with a biomedical signal. The biomedical signal may include an electrocardiogram (ECG) signal, an electroencephalogram (EEG) signal, a body temperature signal, and/or a blood oxygenation signal. The device further may include a sensor for coupling to a subject to collect a biomedical signal from the subject and/or an analog-to-digital converter for converting information associated with the biomedical signal to digital data.

In one embodiment, a method for asynchronously encoding and transmitting information includes transmitting, via at least one communication interface, a first symbol from a predetermined plurality of symbols, selecting a second symbol from the predetermined plurality of symbols, the second symbol being different from the first symbol, to encode digital data based on a predetermined relationship between the first symbol and the second symbol, and transmitting, via the at least one communication interface, the second symbol from the predetermined plurality of symbols thereby encoding the digital data.

In an embodiment, the digital data is associated with a biomedical signal. The biomedical signal may include an ECG signal, an EEG signal, a body temperature signal, and/or a blood oxygenation signal. The method further may include collecting a biomedical signal from a subject and/or converting information associated with the biomedical signal to digital data.

In one embodiment, an asynchronous communication system includes at least one communication interface, at least one transmitter communicatively coupled to the at least one communication interface, and at least one receiver communicatively coupled to the at least one communication interface. The at least one transmitter controls the at least one communication interface to transmit a first symbol from a predetermined plurality of symbols to the at least one receiver. The at least one receiver controls the at least one communication interface to receive the first symbol and compares the first symbol to the predetermined plurality of symbols to determine that the first symbol is valid. The at least one transmitter selects a second symbol from the predetermined plurality of symbols, the second symbol being different from the first symbol, to encode digital data based on a predetermined relationship between the first symbol and the second symbol and controls the at least one communication interface to transmit the second symbol from the predetermined plurality of symbols to the at least one receiver thereby encoding the digital data to the at least one receiver. The at least one receiver controls the at least one communication interface to receive the second symbol, compares the second symbol to the predetermined plurality of symbols to determine that the second symbol is valid, and decodes the encoded digital data based on the predetermined relationship between the first symbol and the second symbol.

In some embodiments, the decoded digital data includes n bits. The predetermined plurality of symbols may include at least $2^n+1$ symbols. For example, the digital data may include 1 bit, 2 bits, 3 bits, 4 bits, or more. The predetermined plurality of symbols may include 3 symbols, 5 symbols, 9 symbols, 17 symbols, or more. In an embodiment, the decoded digital data is a code word associated with the predetermined relationship between the first symbol and the second symbol. The code word may include n bits. The code word may be one of $2^n$ code words associated with the predetermined plurality of symbols. In an embodiment, each of the predetermined plurality of symbols is a signal with at least one unique characteristic relating to one or more frequencies, one or more amplitudes, and/or one or more phases.

In some embodiments, the predetermined relationship is predefined. The predetermined plurality of symbols may have a predefined arrangement and/or order. Each symbol of the predetermined plurality of symbols may have a predefined position in the predefined arrangement and/or order. The predetermined relationship may be based on the predefined position of the second symbol relative to the predefined position of the first symbol in the predefined arrangement and/or order. The predefined arrangement and/or order may include a closed shape. Each symbol of the predetermined plurality of symbols may have a unique predefined position on the closed shape. The predetermined relationship may be based on a number of symbols positioned between the predefined position of the first symbol and the predefined position of the second symbol upon traversal of the closed shape in a predefined direction from the predefined position of the first symbol to the predefined position of the second symbol.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

Other systems, processes, and features will become apparent to those skilled in the art upon examination of the following drawings and detailed description. It is intended that all such additional systems, processes, and features be included within this description, be within the scope of the present invention, and be protected by the accompanying claims.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Telecommunication schemes dictate how digital data can be encoded/decoded using electromagnetic waves, including the amplitude, phase, timing, and/or frequency of the waves. Such schemes include, but are not limited to, amplitude shift keying (ASK), phase shift keying (PSK), pulse position modulation (PPM), frequency shift keying (FSK), and quadrature amplitude modulation (QAM). Most of these schemes require highly accurate primary reference clocks and/or techniques for synchronizing the clock at the receiver node with the clock at the transmitter node.

According to some embodiments, a symbol is a defined characteristic or combination of characteristics of a signal that have meaning and are distinguishable. A symbol may be a signal with at least one defined frequency (as in FSK), defined amplitude (as in ASK), defined phase (as in PSK), or any combination of those characteristics. For example, a symbol may be a signal with a defined phase and a defined amplitude (as in QAM). In another example, a symbol may be a signal with a combination of more than one defined frequency.

In some embodiments, a code word is representative of the actual information or a portion of the actual information being communicated. In digital electronics, the actual information may be represented in the binary numeral system, and a code word may be one or more binary digits or bits. For example, when one bit is available, the code word may be 1 or 0; and when two bits are available, the code word may be 00, 01, 10, and 11. In a synchronous system, each symbol being transmitted may encode the bit value of one code word. For example, using two-bit FSK, frequency symbols $F_a$, $F_b$, $F_c$, and $F_d$ may represent the code words 00, 01, 10, and 11, such that $F_a$=00, $F_b$=01, $F_c$=10, and $F_d$=11.

Usually a code word represented by a symbol is valid or meaningful only when signaled by a "clock;" that is, the clock marks when a given symbol is a valid code word. Even when initially set accurately, real clocks will differ after some amount of time due to clock drift, caused by clocks counting time at slightly different rates. Thus, clock synchronization between the clocks on the transmitter node and the receiver node is usually critical for knowing when a transmitted symbol is valid as new data. For example, without clock synchronization, a receiver node may not know if a transmitter node is sending the same symbol multiple times. Even though some schemes like PPM may not always require synchronization between the clocks on the transmitter node and the receiver node, the precision of the clocks becomes critical at higher data rates as the detectable time difference between pulses becomes smaller.

Figure 1:
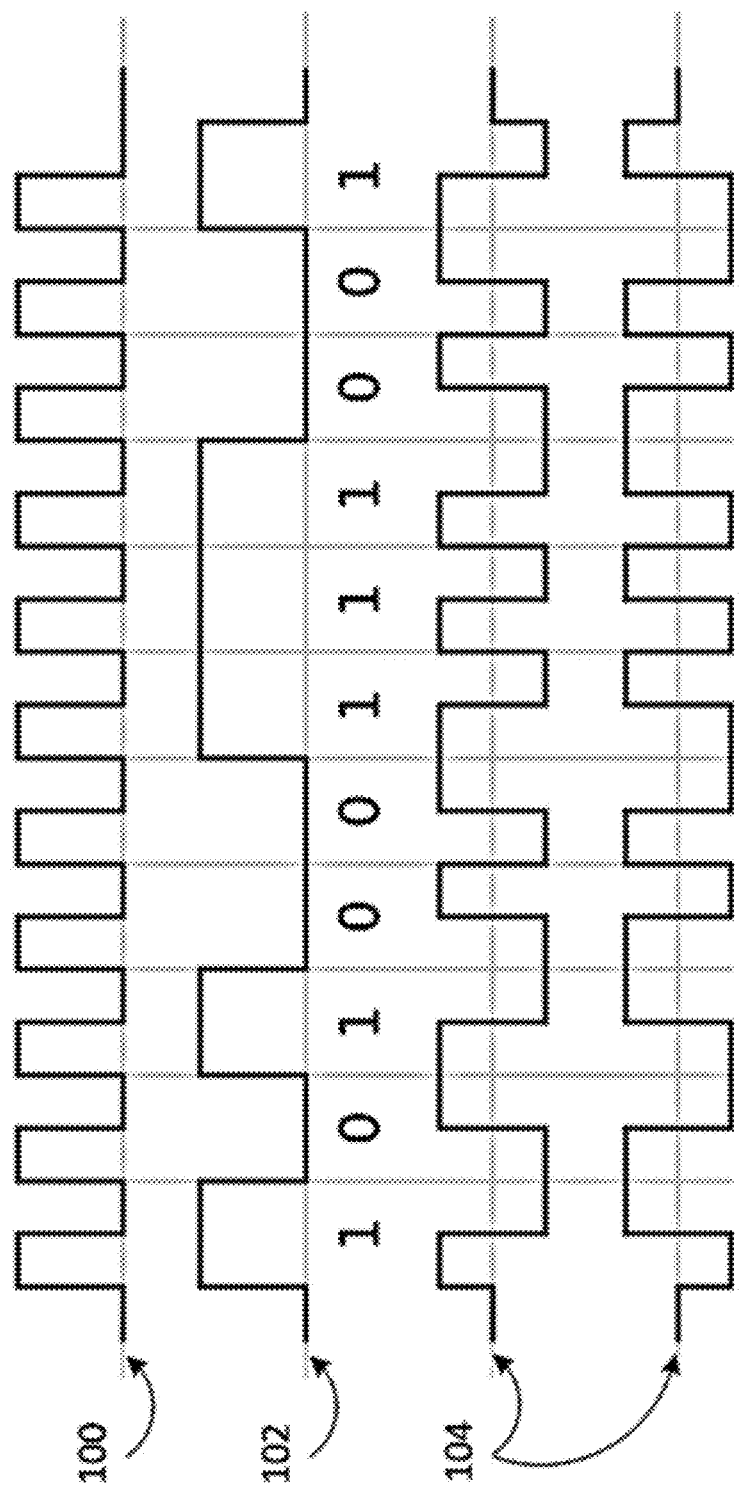
FIG. 1 illustrates signals for clock synchronization between a transmitter node and a receiver node.

FIG. 1 illustrates signals for clock synchronization between a transmitter node and a receiver node. A clock signal 100 oscillates between a high and low state to coordinate the nodes. Alternatively, synchronization information may be sent simultaneously with data signal 102. For example, versions of the Manchester code self-clocking signal 104 are combinations of the clock signal 100 embedded within the data signal 102. The Manchester code self-clocking signal 104, as well as other synchronization information, may require various constraints to prevent clock drift, such as word length and/or a maximum number of consecutive symbols.

In an effort to reduce the overhead in data transmission that is used for clock synchronization, and moderate power consumption by circuits that perform the synchronization, the disclosed systems and methods use a new scheme of digital communication that is asynchronous. The validity of a new code word may be determined not according to when the symbol is assigned as with synchronous communication (i.e., the clock), but rather according to the change from an "old" symbol to a "new" symbol. That is, in asynchronous communication according to some embodiments, new data is valid when a different predetermined symbol is sent, regardless of how that predetermined symbol is defined (e.g., at least one of frequency, amplitude, phase, etc.).

According to some embodiments, instead of sending a symbol for every code word, the code word is embedded in a predetermined relationship between two symbols. At any given point in time a transmitter will be sending one of a set of predetermined unique symbols, which may be referred to as the "old" symbol. When the transmitter sends a different or "new" symbol, a predetermined relationship between the old symbol and the new symbol will be used by the receiver to determine the value of the code that is sent. Then the new symbol becomes the old symbol and the process starts over again.

A predetermined relationship between an old symbol and a new symbol may be selected and/or modeled and determined in numerous ways. In some embodiments, a predetermined relationship is based on definition. For example, if three symbols A, B, and C are used to encode/decode three 1-bit code words, the predetermined relationships may be defined as follows in TABLE 1:

TABLE 1

| Old Symbol | Predetermined Relationship with New Symbol |
|---|---|
| A | if B, then code word "0" |
|   | if C, then code word "1" |
| B | if A, then code word "0" |
|   | if C, then code word "1" |
| C | if A, then code word "0" |
|   | if B, then code word "1" |

In some embodiments, a predetermined relationship is based on relative position. For example, a plurality of symbols may be arranged in a predetermined order that informs predetermined relationships between each of the symbols. In a particularly useful example, a plurality of symbols may be modeled as positioned around a closed shape, such as a circle, in a predefined order. A number of symbols or segments traversed between the old symbol and the new symbol may indicate the code word. For example, when a code word is encoded, a transmitter may determine the new symbol for transmission by traversing the circle in a predetermined direction (e.g., clockwise) from the old symbol until a number of symbols or segments are traversed that defines the code word. Meanwhile, when the new symbol is decoded, the receiver may determine the code word by traversing the circle in the same predetermined direction, starting at the old symbol, stopping at the new symbol, and identifying the code word based on the number of symbols or segments between the old symbol and the new symbol.

Figure 2A:
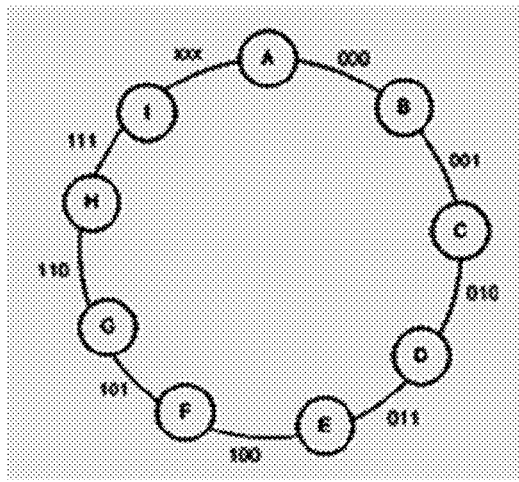
FIGS. 2A to 2F are diagrams illustrating asynchronous communication in accordance with some embodiments.
Figure 2B:
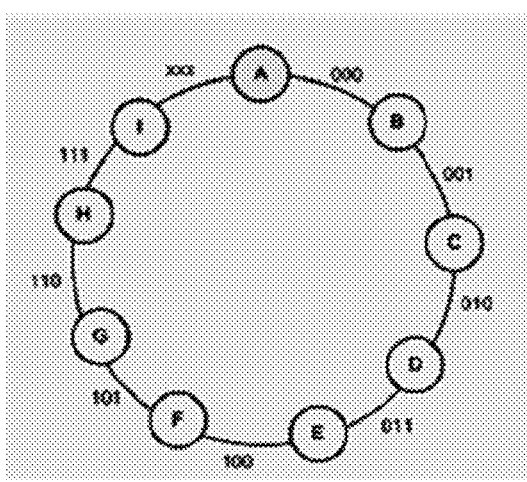

FIGS. 2A to 2F are diagrams illustrating the application of asynchronous communication between nine symbols according to some embodiments. Nine unique signals (e.g., unique frequencies, amplitudes, phases, or combinations thereof) are needed to encode/decode three bits per symbol transition. The nine unique symbols are represented by alphabetical symbols "A" through "I" in FIGS. 2A-2F. In this embodiment, the predetermined relationship is based on the relative positions of the unique symbols as modeled around a circle traversed in a clockwise direction. Each of the segments connecting consecutive symbols represents a code word that is assigned depending on which symbol was last to be transmitted. FIG. 2A illustrates the initial state of the system when no symbols are being transmitted. In FIG. 2B, the transmitter begins transmitting symbol "A."

Figure 2C:
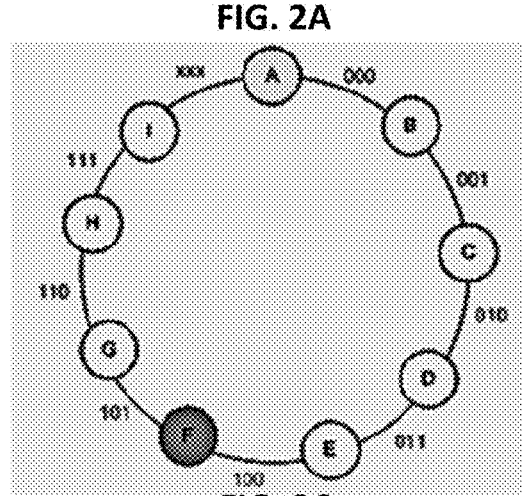
Figure 2D:
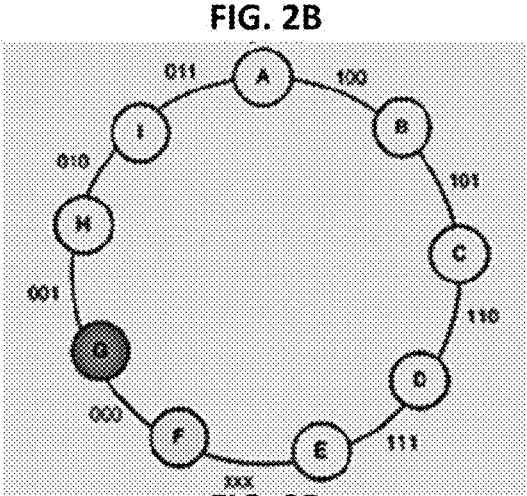
Figure 2E:
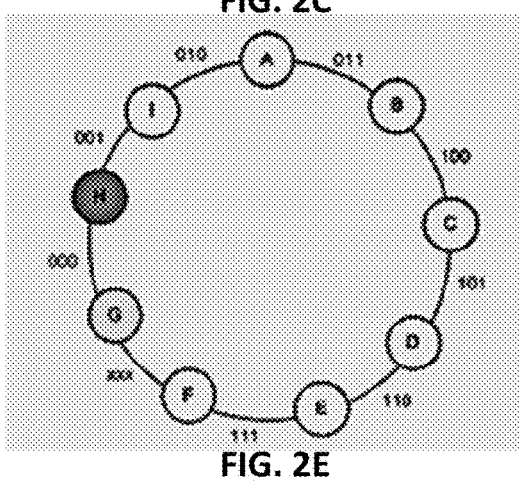
Figure 2F:
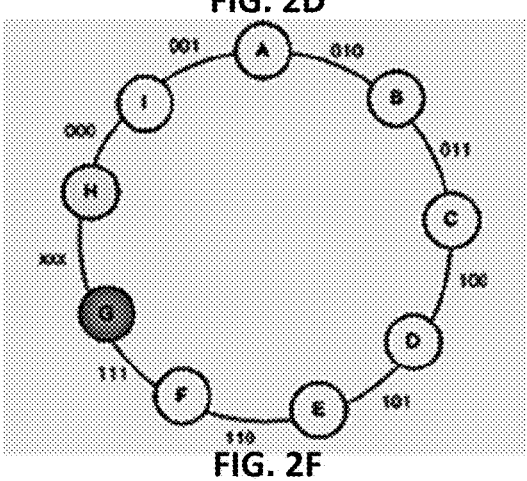

Then, in FIG. 2C, the transmitter quits sending symbol "A" and begins transmitting symbol "F" instead. This symbol transition, or hop, from symbol "A" to symbol "F" indicates that a new code word is valid. Because there are five segments traversed on the circle between symbols "A" and "F" the code word is 100 ("4"). In FIG. 2D, the transmitter quits sending symbol "F" and begins transmitting symbol "G" instead. This hop from symbol "F" to symbol "G" indicates that a new code word is valid. Because there is one segment traversed on the circle between symbols "F" and "G" the code word is 000 ("0"). In FIG. 2E, the transmitter quits sending symbol "G" and begins transmitting symbol "H" instead. This hop from symbol "G" to symbol "H" indicates that a new code word is valid. Because there is only one segment between symbols "G" and "H" the code word is 000 ("0") again. In FIG. 2F, the transmitter quits sending symbol "H" and begins transmitting symbol "G" instead. This symbol transition, or hop, from symbol "H" to symbol "G" indicates that a new code word is valid. Because there are eight segments between symbols "H" and "G" the code word is 111 ("7").

This proposed technique to achieve asynchronous communication can be applied to any form of digital communication and adapted for most existing telecommunication schemes (e.g., FSK, ASK, PSK, QAM, etc.). Currently in a standard digital communication scheme, $2^n$ symbols are required to send n bits of data. For example, 16-QAM has 16 symbols, where each symbol represents a unique 4 bit code. In general, n-bit QAM can be made asynchronous by adding at least one additional symbol to the symbol set. In asynchronous QAM, each symbol transition needs to be able to encode/decode $2^n$ code words. Thus, in addition to a first symbol (i.e., the "old" symbol) initiating transmission, there will need to be $2^n$ unique symbols (i.e., "new" symbols) to transition to for a total of $2^n+1$ symbols.

Figures 3A, 3B:
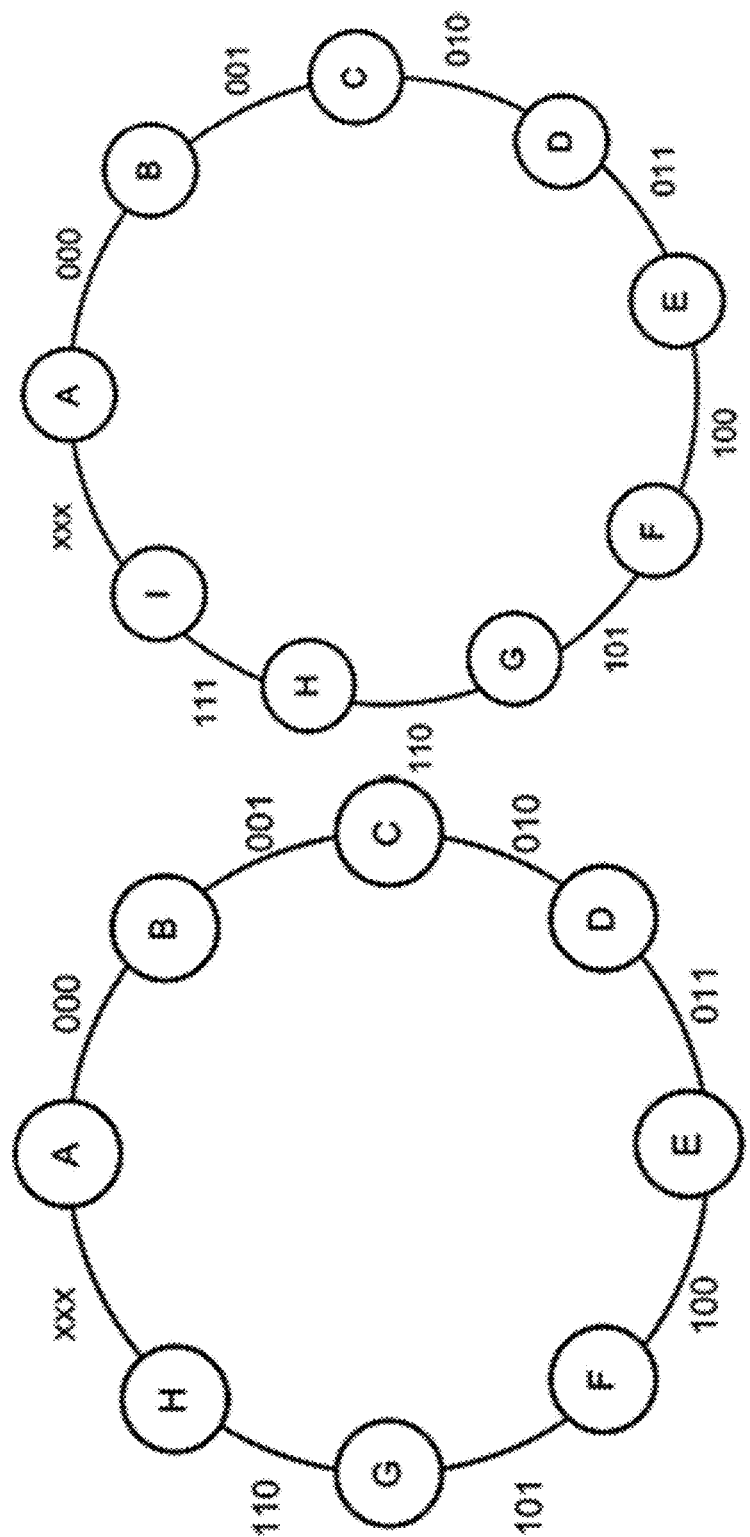
FIGS. 3A and 3B are diagrams illustrating the need for $2^n+1$ symbols to asynchronously communicate n bits of data in accordance with some embodiments.

For example, in FIG. 3A, eight predetermined symbols "A" through "H" are positioned around a circle with three bits between each symbol as may be used, for example, in asynchronous 3-bit FSK. However, the maximum number of code words (e.g., segments between any two unique symbols in FIG. 3A) is only $2^n-1$ segments. In FIG. 3B, nine predetermined symbols "A" through "I" are positioned around a circle with three bits between each symbol. As in FIGS. 2A-2F, the maximum number of code words (e.g., segments between any two unique symbols in FIG. 3B) is $2^n$ code words. Thus, the addition of one symbol allows the unique symbols to represent $2^n$ unique binary code words. The need to add an additional symbol is true, regardless of which telecommunication scheme is used to encode/decode the symbols. As long as the symbols can be detected without a clock, then no clock is needed for the scheme.

Figure 4A:
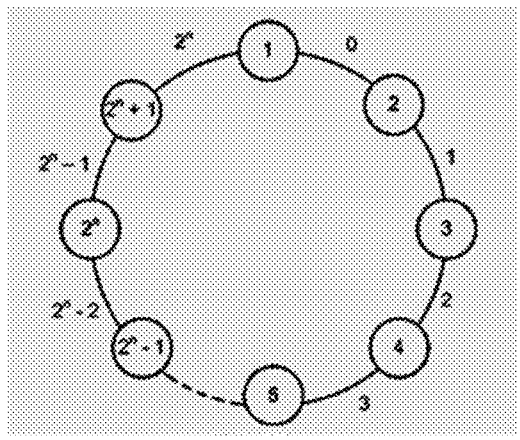
FIGS. 4A to 4E are diagrams illustrating asynchronous communication in accordance with some embodiments.
Figure 4B:
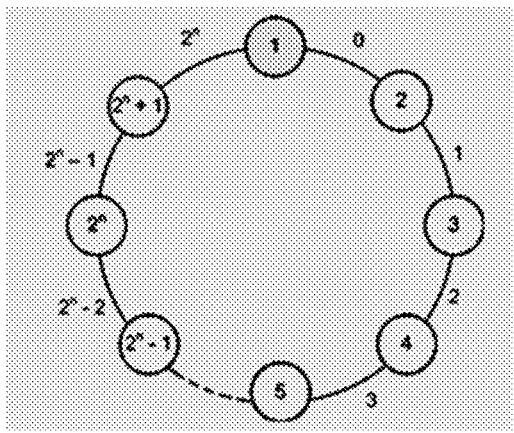

FIGS. 4A to 4E are diagrams illustrating the application of asynchronous communication according to some embodiments. To encode/decode n bits per segment, $2^n+1$ unique symbols are needed, represented in FIGS. 4A to 4E by numeric symbols "1" through "$2^n+1$." Each unique symbol is positioned around a circle, and data is encoded with the segments between valid symbols. FIG. 4A illustrates the initial state of the system when no symbols are being transmitted. In FIG. 4B, the transmitter begins transmitting symbol "1."

Figure 4C:
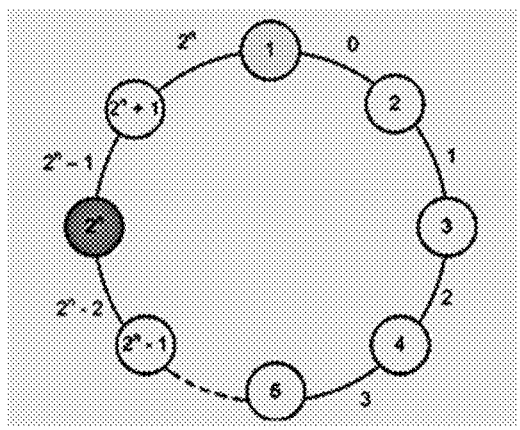
Figure 4D:
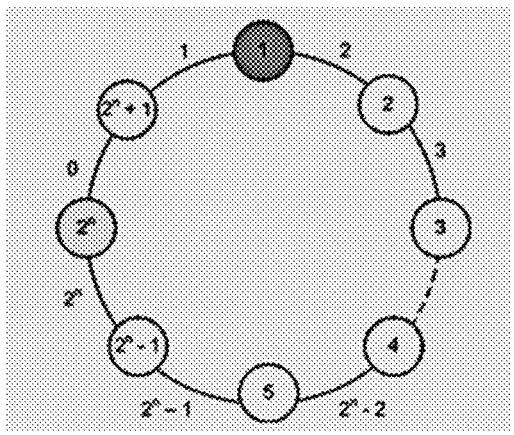
Figure 4E:
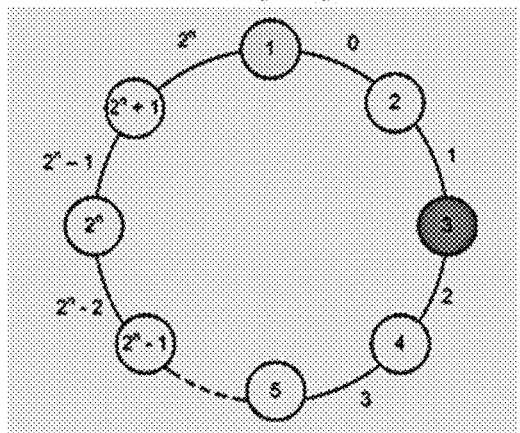
Figure 5A:
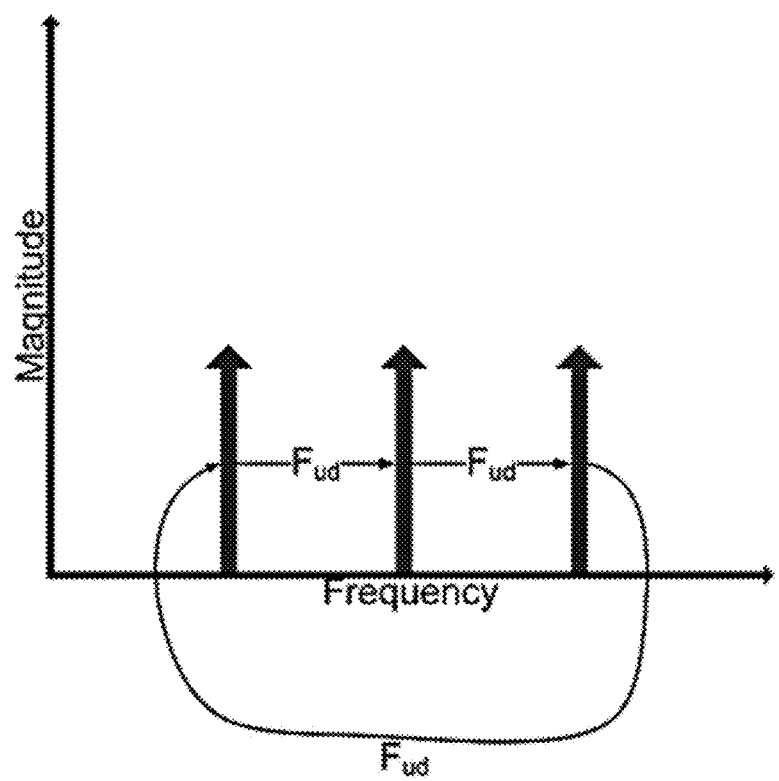
FIG. 5A is a graph illustrating asynchronous FSK.

Then, in FIG. 4C, the transmitter quits sending symbol "1" and begins transmitting symbol "2''''" instead. This transition from symbol "1" to symbol "2''''" indicates that new code word "$2^n-1$" is valid based on the segments between symbols "1" and "2''''." In FIG. 4D, the transmitter quits sending symbol "2" and begins transmitting symbol "1" instead. This hop from symbol "2''''" to symbol "1" indicates that new code word "1" is valid based on the segments between symbols "2''''" and "1." In FIG. 4E, the transmitter quits sending symbol "1" and begins transmitting symbol "3" instead. This hop from symbol "1" to symbol "3" indicates that new code word "1" is valid based on the segments between symbols "1" and FIG. 5A is a graph illustrating asynchronous FSK according to some embodiments. Each frequency transition is a new valid symbol. The value of each transition is determined by the frequency distance between the frequency prior to the frequency transition and the new frequency following the frequency transition. A unit of frequency distance $F_{ud}$ may be defined as the distance from the highest frequency to the lowest frequency. Additional bits may be encoded per hop as long as sufficient frequencies are available. That is, for n bits to be encoded per symbol transition, there must be $2^n+1$ frequencies available. In FIG. 5A, only three frequencies are available so only one bit may be encoded per symbol transition.

Figure 5B:
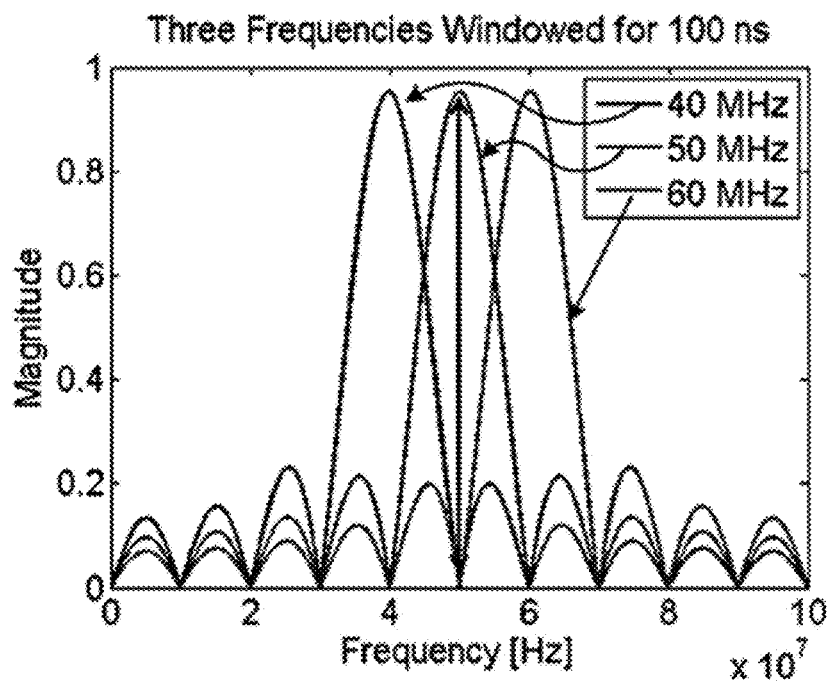
FIG. 5B is a graph illustrating finite resolution of frequency detection in accordance with some embodiments.

FIG. 5B is a graph illustrating finite resolution of frequency detection according to some embodiments. In FIG. 5B, three frequencies (i.e., 40 MHz, 50 MHz, and 60 MHz) are windowed by the symbol rate or transition rate of 100 ns, and the width of the main lobe is twice the frequency of the symbol rate or transition rate window. According to some embodiments, the maximum magnitude of a frequency is positioned when the magnitudes of all other frequencies are zero for maximum noise tolerance in frequency detection. For example, in FIG. 5B, when the magnitude of the 50 MHz frequency is greatest, the magnitudes of the 40 MHz and 60 MHz frequencies are zero. The symbol rate or transition rate may be selected for minimum frequency spacing.

Representative Use Cases

Systems and methods of asynchronous digital communication are disclosed that enable low power transmission of signals by encoding/decoding digital information in such a way that the timing of the digital signal does not need to be constant, and does not need a clock to be decoded. One of the driving forces behind wearable, implantable, and attachable device design is power consumption, partly due to the small form factors associated with such devices. The wireless transmitters used in transmitting the information off the body (or to other devices on the body) can be one of the largest consumers of power for these devices. Thus, the disclosed systems and methods can help alleviate that power budget by reducing the power needs of the timing functions.

Some embodiments may enable monitoring of signals including, but not limited to, signals from a transducer (e.g., piezoelectric) that is not directly accessible, signals between integrated circuits, other semiconductor devices, and/or their packaging during semiconductor device fabrication (e.g., multiple dies in three-dimensional integrated circuit), or biomedical signals.

Biomedical signals, such as an electrocardiogram (ECG) or an electroencephalogram (EEG), are often recorded from areas of a subject's body where attaching sensors with large form factors would be incompatible with long-term use due to, for example, lack of comfort. On the other hand, sensors with small form factors limit battery size, that is, the sensors must have lower power budgets if long-term use is desired. Due to the low frequency bandwidth of most biological signals and advances in low power circuitry, the circuits necessary to detect and amplify biological signals require less power. The largest power consumption for medical sensors usually comes from storing the captured data to a memory device or using radio transmission to transmit the captured data.

A body area network (BAN) or body sensor network (BSN) further may alleviate power budgets for fixed and mobile devices like physiological sensors, by providing a low power localized wireless network around a subject's body by which data can be sent to a base station. In a common configuration for biomedical applications, one or more low power sensors are located in (implanted), on (direct contact), and/or near (proximate) a subject's body to monitor one or more biomedical signals (e.g., vital signs) of the subject. These biomedical signals may be transmitted to one or more base stations, which also may be located on and/or near the subject. While sensor nodes are usually located at areas of a subject's body where small form factors are preferred, some areas including, but not limited to, portions of a subject's torso or extremities may support larger form factors for longer periods of time. For example, the human waist and/or wrist may support (more comfortably) larger form factors, such as a base station with a larger battery. With greater power capacity, the local base station may perform higher power functions like storing data to memory or transmitting the information off the subject's body. Thus, a local base station may alleviate the power budget of a sensor node if the power required to transmit data to the base station is lower than the power required for the sensor node to accomplish a desired function.

Figures 6A, 6B:
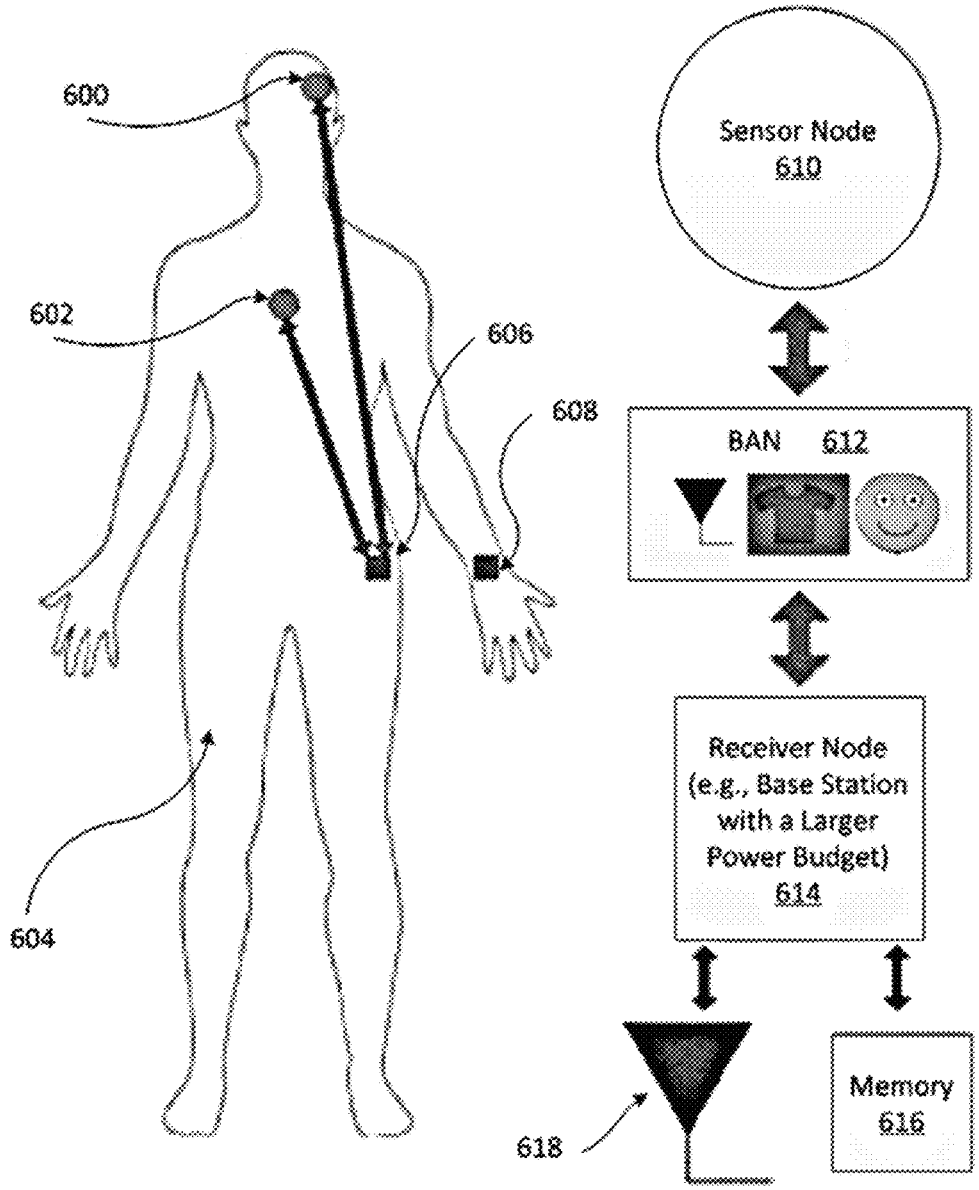
FIG. 6A is a diagram illustrating a body area network (BAN)
FIG. 6B is a diagram illustrating different ways to implement the BAN in FIG. 6A in accordance with some embodiments.

FIG. 6A is a diagram illustrating a BAN according to some embodiments. In FIG. 6A, sensor nodes 600 and 602 are implanted, attached, or otherwise coupled to a body 604 of a human subject. For example, sensor node 600 may collect brain-related (e.g., EEG) signals, and sensor node 602 may collect heart or lung-related (e.g., ECG) signals. In some embodiments, only one sensor node or a plurality of sensor nodes are coupled to a body of a subject. In FIG. 6A, receiver nodes 606 and 608 are also attached to or kept within proximity of the body 604. For example, receiver node 606 may be worn, for example, as a patch attached to the body 604 or provided as part of a device (e.g., a smart phone) that the subject keeps in a pocket. Alternatively or in addition, receiver node 608 may be provided as part of a device (e.g., a smart watch) that the subject may wear, for example, on a wrist. In some embodiments, only one receiver node or a plurality of receiver nodes are kept within proximity of a subject.

FIG. 6B is a diagram illustrating different ways to implement the BAN in FIG. 6A according to some embodiments. In FIG. 6B, at least one sensor/transmitter node 610 collects and transmits a biomedical signal over BAN 612 to at least one receiver node 614. Some processing may be completed at the at least one sensor/transmitter node 102 to reduce the amount of information sent over BAN 112. BAN 112 may be implemented using one or more communication channels including, but not limited to, textiles embedded with wires (eTextiles), radio network channels, such as the Bluetooth® wireless technology standard for exchanging data over short distances, and a subject's body itself as a network channel in body coupled communication (BCC).

An eTextiles-based BAN channel has the lowest amount attenuation, as the channel is simply wires. Energy requirements are also lower in an eTextiles-based BAN channel because the receiver node does not need to amplify the signal from the sensor node. However, the subject must wear the eTextiles, for example, in the form of specialized clothing, and the eTextiles must cover and/or contact any location on the subject's body where a sensor node must be positioned.

A radio or BCC-based BAN channel provides greater flexibility for positioning sensor nodes at the price of higher attenuation in the channel and hence higher power dissipation for equivalent data transmission. According to some embodiments, BCC is a lower power alternative to radio-based BANs, particularly with a new receiver circuit to increase channel gain and/or a new digital communication scheme. BCC refers to signal transmissions over a channel that includes a body. That is, BCC uses the subject's body as a transmission medium for electrical data signals. BCC makes capacitive links with the human body and the environment to form a channel in which AC current can be transmitted. The environment can be anything that is conductive in the area around the human body, from a chair or tree, to the physical ground itself.

Figure 7A:
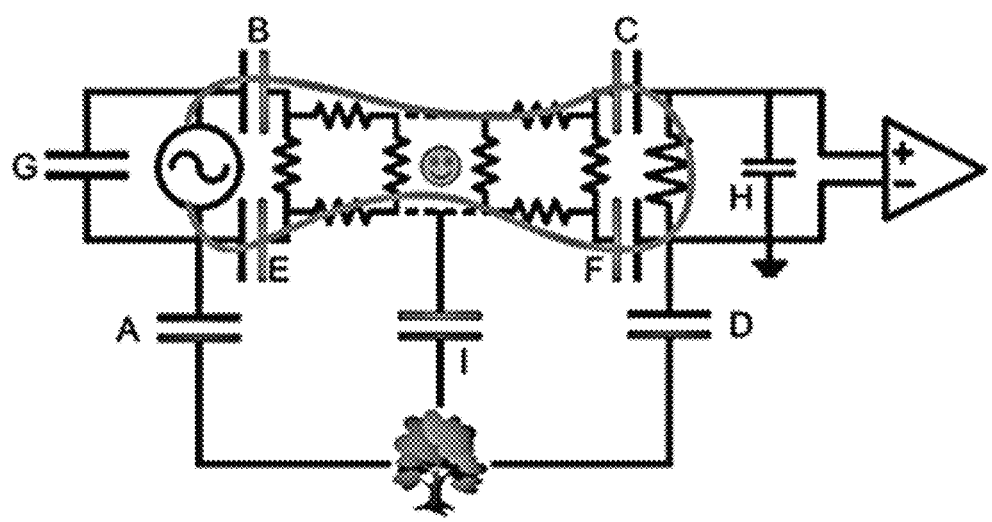
FIG. 7A is a circuit model of a body coupled communication (BCC) channel with the body modeled as spreading resistance.

FIG. 7A is a circuit model of a BCC channel with the body modeled as spreading resistance according to some embodiments. A BCC channel may be characterized as two high pass filters, one formed by the capacitive links from the transmitter and the spreading resistance of the body, and the other formed by the capacitive links from the receiver and the receiver's input resistance. The corner frequencies of the high-pass filters are dependent on properties and movement of the body, and therefore may change during transmission, thereby changing the channel's attenuation. Phase and amplitude also may be difficult to control. Thus, data transmission in a BCC channel may be most robust when encoded/decoded with schemes that rely on change of frequencies such as asynchronous FSK or timing, versus phase and/or amplitude.

Figure 7B:
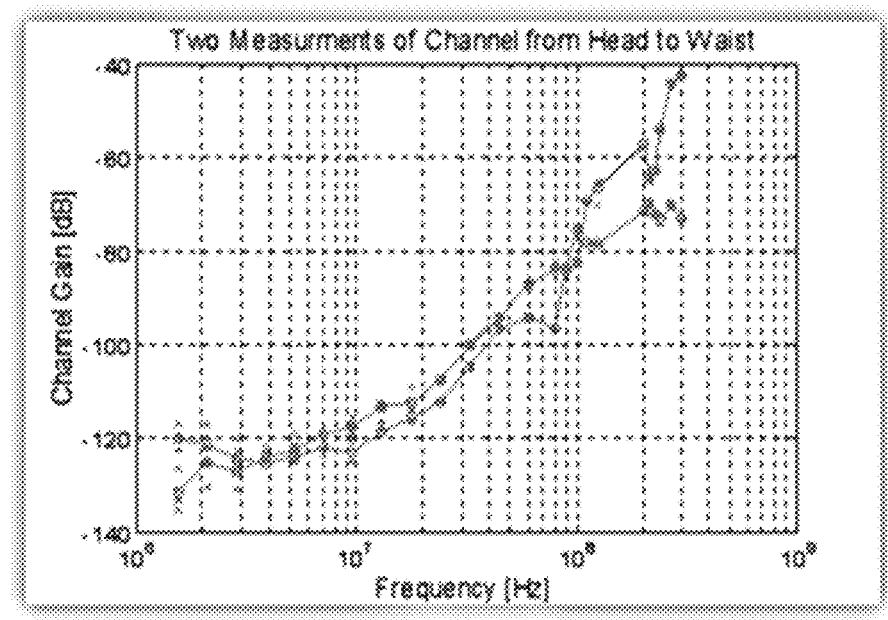
FIG. 7B is a graph of two measurements of a BCC channel from the head to the waist of a human subject in accordance with some embodiments.

Two properties of BCC make it highly attractive to form BANs. Both properties are the result of using the electric near-field to send signals which cause the signals to attenuate proportional to the distance cubed. This inherently allows for greater security than radio, because conspicuously close proximity to the body is required to connect to the network. The rapid attenuation of the signal farther away from the body also reduces interference from other BCC networks, which allows for reusable bandwidth. Also, increasing the input resistance of the receiver will increase one of the high-pass filter's pass bands and decrease its corner frequency, resulting in higher gain in the BCC channel over the frequency band of interest. FIG. 7B is a graph of two measurements of a BCC channel from the head to the waist of a human subject according to some embodiments. As can be seen in FIG. 7B, as frequency increases so does channel gain. However, as the input resistance increases it is easier for any stray signals to couple into the input of the receiver, including the receiver's own amplified signal, causing positive feedback and limiting how large the input resistance can be. While specific examples may be described in the context of BCC, embodiments are not limited to BCC.

Returning to FIG. 6B, at least one receiver node 614 receives the biomedical signal over BAN 612. The receiver node 614 may be a base station with a larger power budget for storing the biomedical signal to a memory device 616 and/or transmitting the biomedical signal to an off-body device for further processing, display, etc. The base station for many sensor applications may use a mobile and/or wearable device, such as a smart phone or a smart watch, equipped with a BCC transceiver. As the device would have to be in close proximity to the body to receive the data, the device could be worn or stored, for example, in a pocket or a case attached to a belt.

Some embodiments may be incorporated into a biomedical signal monitoring system. The biomedical signal may include one or more physiological measures including, but not limited to, heart rate, breathing rate, temperature, and blood pressure. The biomedical signal monitoring system may include one or more sensor nodes for collecting one or more biomedical signals. The biomedical signal monitoring system may include one or more storage devices to store data corresponding to the one or more collected biomedical signals. The biomedical signal monitoring system may include one or more communication interfaces for transmitting the one or more collected biomedical signals to a second node, such as a mobile computing device (e.g., cell phone, smart phone, or tablet) or a wearable computing device (e.g., a smart watch or smart glasses).

Some embodiments may enable lifestyle and healthcare applications. A lifestyle application may include, but is not limited to, wearable technology and computing solutions in which multiple devices may wirelessly communicate with each other. A healthcare application may include patient monitoring inside and/or outside a biomedical environment. For example, a healthcare application may include measuring and/or monitoring electrocardiogram (ECG) signals, electroencephalogram (EEG) signals, body temperature, and/or blood oxygenation.

EXAMPLES

Figure 8A:
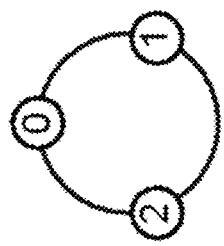
FIG. 8A is a diagram illustrating asynchronous communication.

Asynchronous digital communication was reduced to practice by fabricating an asynchronous transmitter and receiver according to some embodiments. This particular embodiment was designed to send one bit of information per symbol sent, thus the transmitter was required to send three unique symbols ($2^n+1$ symbols for n bits), and the receiver had to be able to distinguish these three symbols as shown in FIG. 8A.

The three symbols $S_0$, $S_1$, and $S_2$ were associated with wires $W_0$, $W_1$, and $W_2$, respectively, to encode the information. That is, each wire represented one symbol. To send a symbol, the voltage on the associated wire was brought high to VDD, in this case 3.3 V. That is, 3.3 V meant that a symbol was present, whereas 0 V, with respect to ground, meant a symbol was not present. When no symbols were being transmitted, the voltage on the wires, with respect to ground, was zero.

Figure 8B:
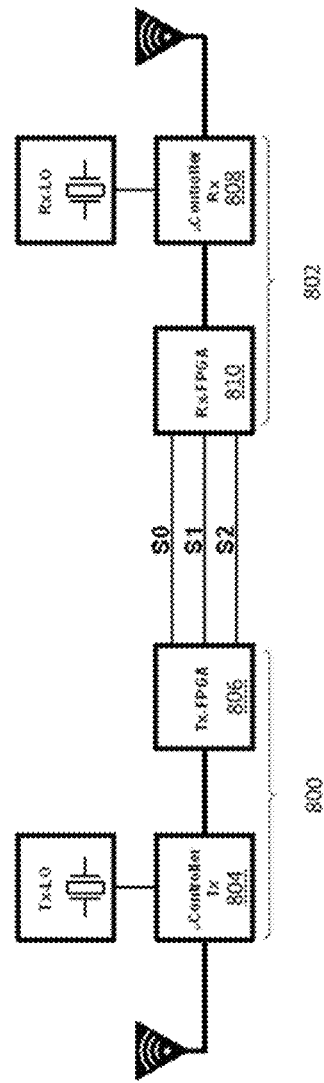
FIG. 8B is a block diagram illustrating a transmitter and a receiver in accordance with some embodiments.

FIG. 8B is a block diagram illustrating the transmitter 800 and the receiver 802 according to some embodiments. To test the asynchronous nature of the communication, the transmitter and receiver did not share a common clock according to some embodiments. The only connections between the transmitter and the receiver were the three wires $W_0$, $W_1$, and $W_2$, representing symbols $S_0$, $S_1$, and $S_2$. The transmitter 800 consisted of a microcontroller 804 connected to a field-programmable gate array (FPGA) integrated circuit 806, using a standard Serial Peripheral Interface (SPI). WiFi was used to send a byte of information from a computing device to the transmitter 800. The microcontroller 804 used the SPI to give the FPGA 806 the byte, and the FPGA 806 encoded and sent the encoded byte to the receiver 802 using asynchronous communication over wires $W_0$, $W_1$, and $W_2$, representing symbols $S_0$, $S_1$, and $S_2$.

The receiver 802 also consisted of a microcontroller 808 connected to a FPGA integrated circuit 810, using a standard SPI. The FPGA 810 was used to continuously monitor the voltage on all three wires $W_0$, $W_1$, and $W_2$, representing symbols $S_0$, $S_1$, and $S_2$. When a wire's voltage went high, the receiver determined which associated symbol was being transmitted. The FPGA 810 then decoded the asynchronously communicated symbols back into standard binary and used the SPI port to send it to the microcontroller 808. WiFi was used to send the decoded information back to the computing device, where it was compared with and found to match the original byte of information.

Figure 9:
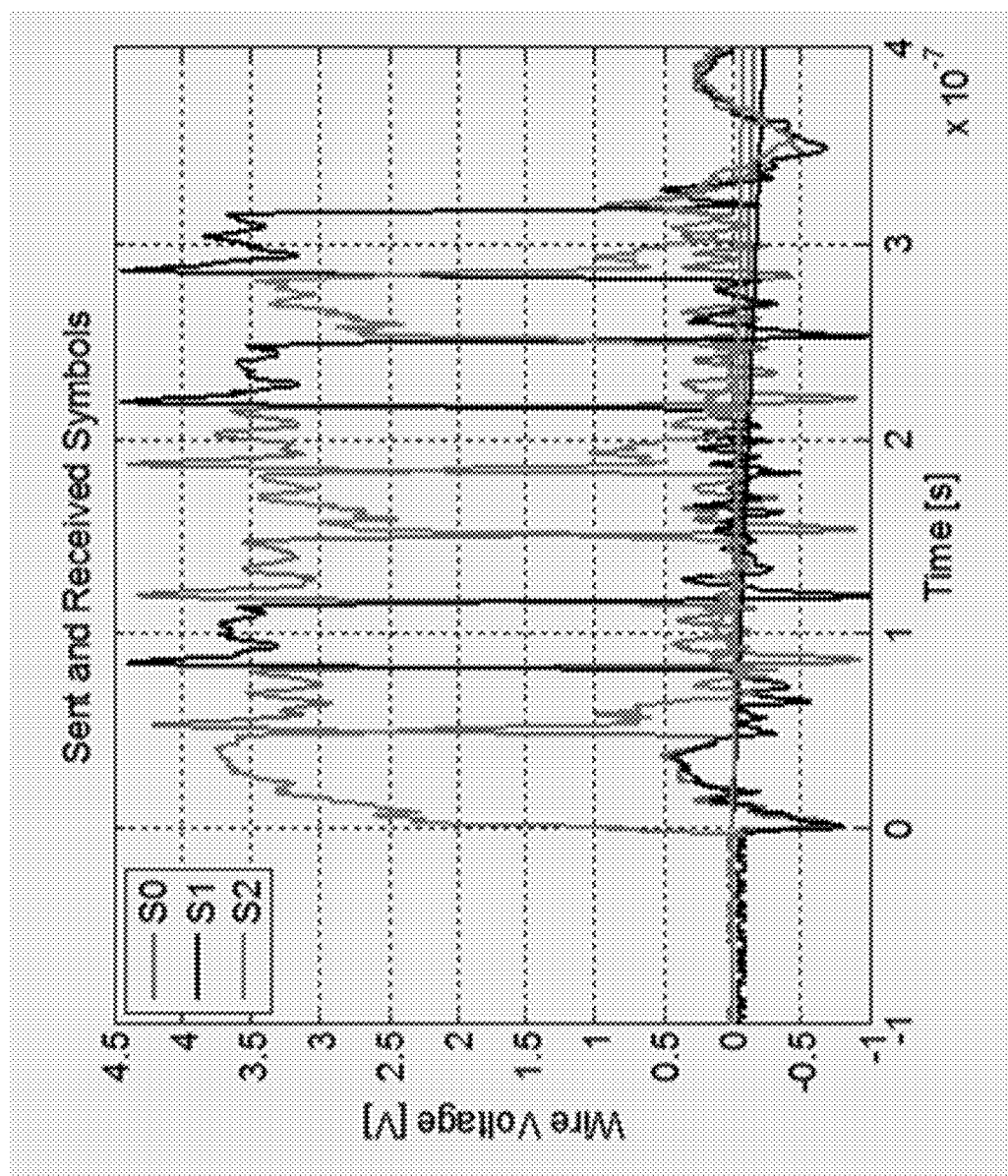
FIG. 9 is a graph illustrating three asynchronously transceived symbols in accordance with some embodiments.
Figure 10:
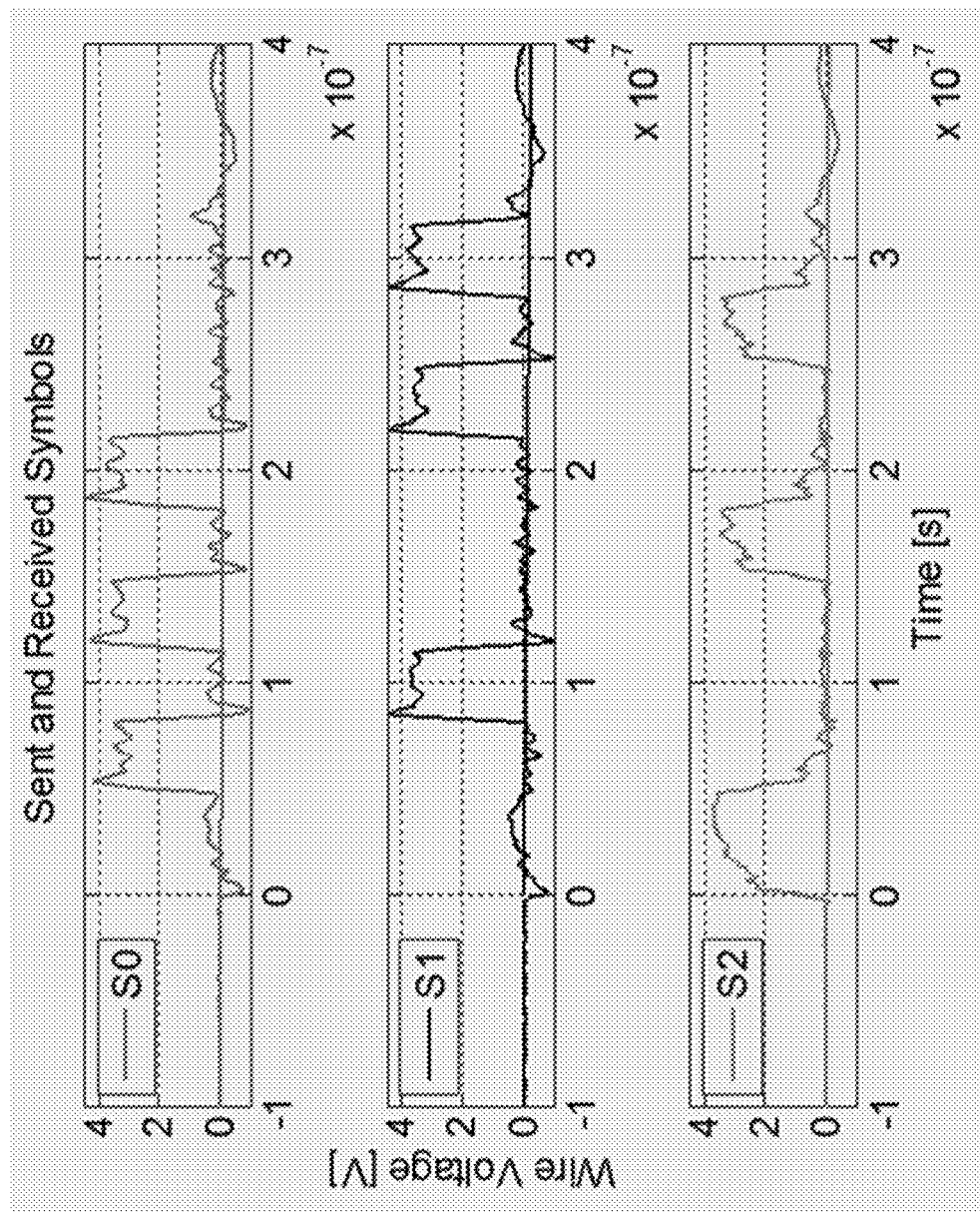
FIG. 10 is a series of graphs, each illustrating one of the three asynchronously transceived symbols in FIG. 9, in accordance with some embodiments.

In this case, eight bits indicating eight symbols transitions were sent: "00110001." FIG. 9 is a graph illustrating the symbols $S_0$, $S_1$, and $S_2$ as sent by the transmitter 800 and as received by the receiver 802. FIG. 10 separates the graph in FIG. 9 into three separate graphs for each of the symbols $S_0$, $S_1$, and $S_2$ in order to more clearly observe the relative order of each individual symbol as sent by the transmitter 800 and as received by the receiver 802. These graphs are discussed further in FIGS. 11A through 19B.

Figure 11A:
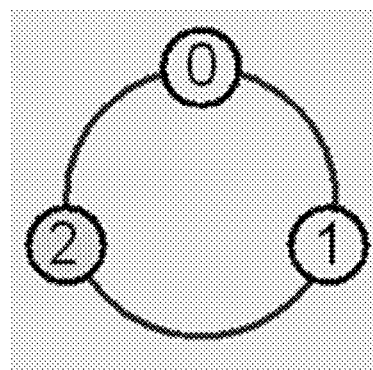
FIG. 11A is a diagram illustrating a first step in asynchronous communication.
Figure 11B:
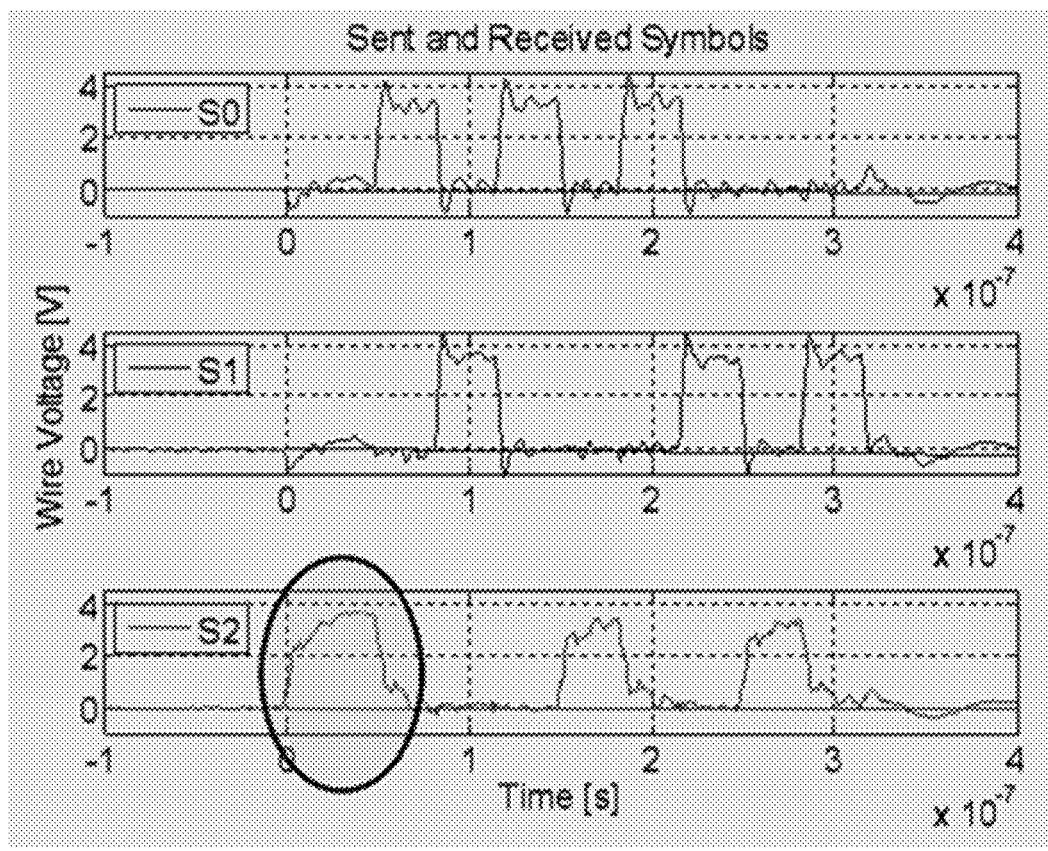
FIG. 11B is the series of graphs from FIG. 10 adapted to identify the first step, in accordance with some embodiments.
Figure 12A:
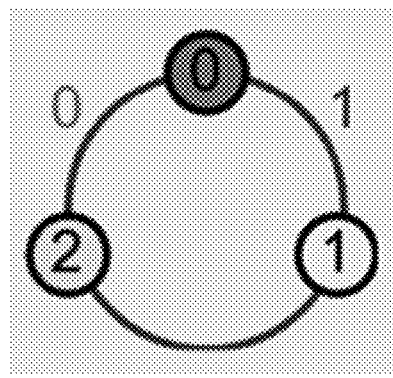
FIG. 12A is a diagram illustrating a second step in asynchronous communication.
Figure 12B:
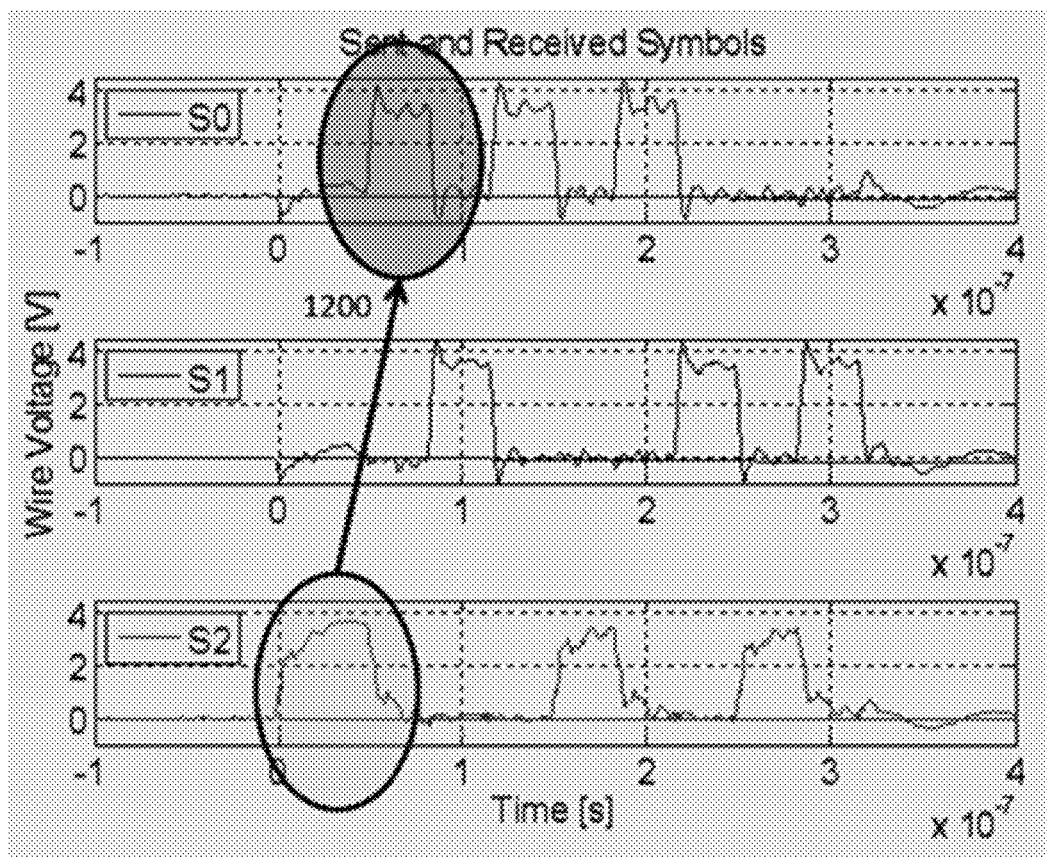
FIG. 12B is the series of graphs from FIG. 10 adapted to identify the second step, in accordance with some embodiments.

FIGS. 11A and 11B (graph $S_2$) illustrate the initiation of transmission when symbol $S_2$ is transceived (i.e., voltage on wire $W_2$ was brought high). In FIGS. 12A and 12B (graph $S_0$), symbol $S_0$ is transceived (i.e., voltage on wire $W_2$ was reduced to zero, and voltage on wire $W_0$ was brought high). The transition 1200 from symbol $S_2$ to symbol $S_0$ indicates that a first bit of information has been sent and, according to the predetermined relationship between symbol $S_2$ and symbol $S_0$, the value of the first 1-bit code word is "0."

Figure 13A:
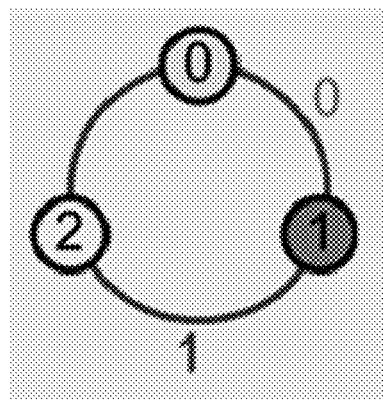
FIG. 13A is a diagram illustrating a third step in asynchronous communication.
Figure 13B:
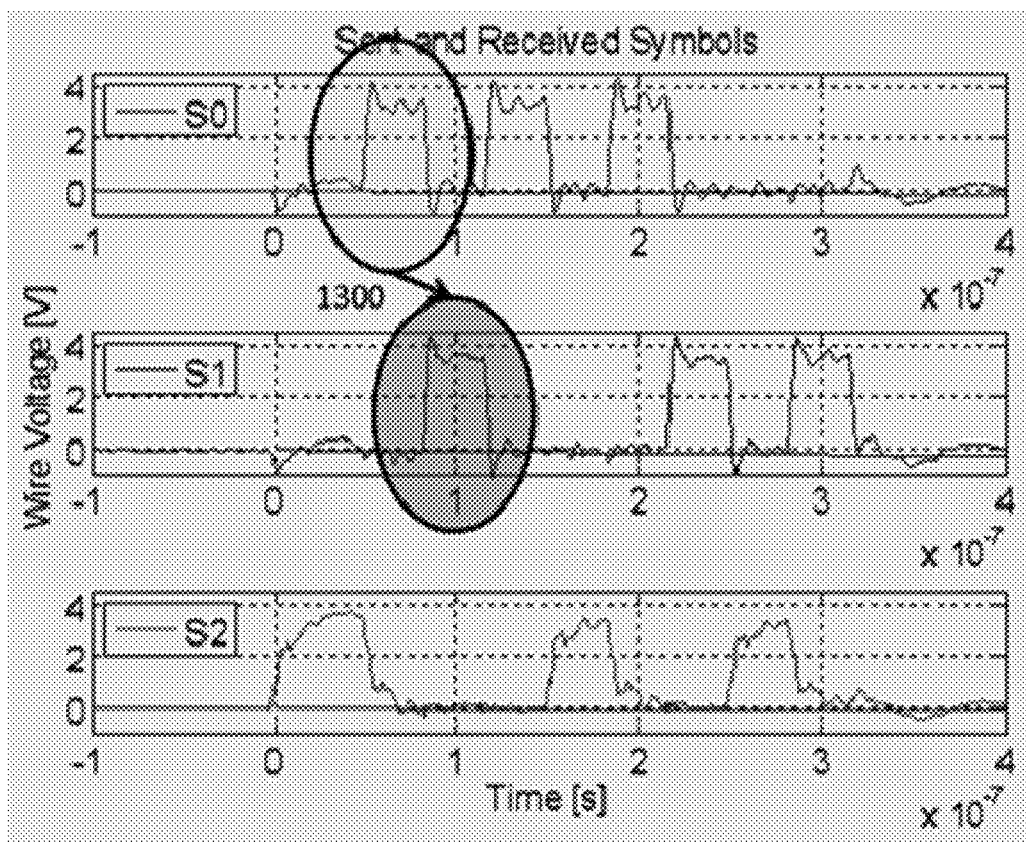
FIG. 13B is the series of graphs from FIG. 10 adapted to identify the third step, in accordance with some embodiments.

In FIGS. 13A and 13B (graph $S_1$), symbol $S_1$ is transceived (i.e., voltage on wire $W_0$ was reduced to zero, and voltage on wire $W_1$ was brought high). The transition 1300 from symbol $S_0$ to symbol $S_1$ indicates that a second bit of information has been sent and, according to the predetermined relationship between symbol $S_0$ and symbol $S_1$, the value of the second 1-bit code word is "0," for a total bit string of "00."

Figure 14A:
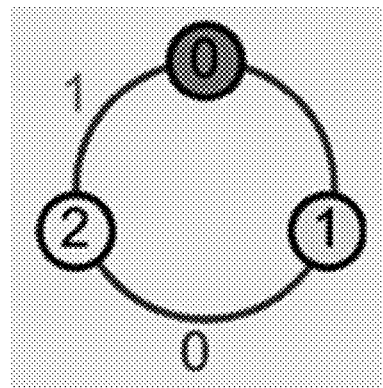
FIG. 14A is a diagram illustrating a fourth step in asynchronous communication.
Figure 14B:
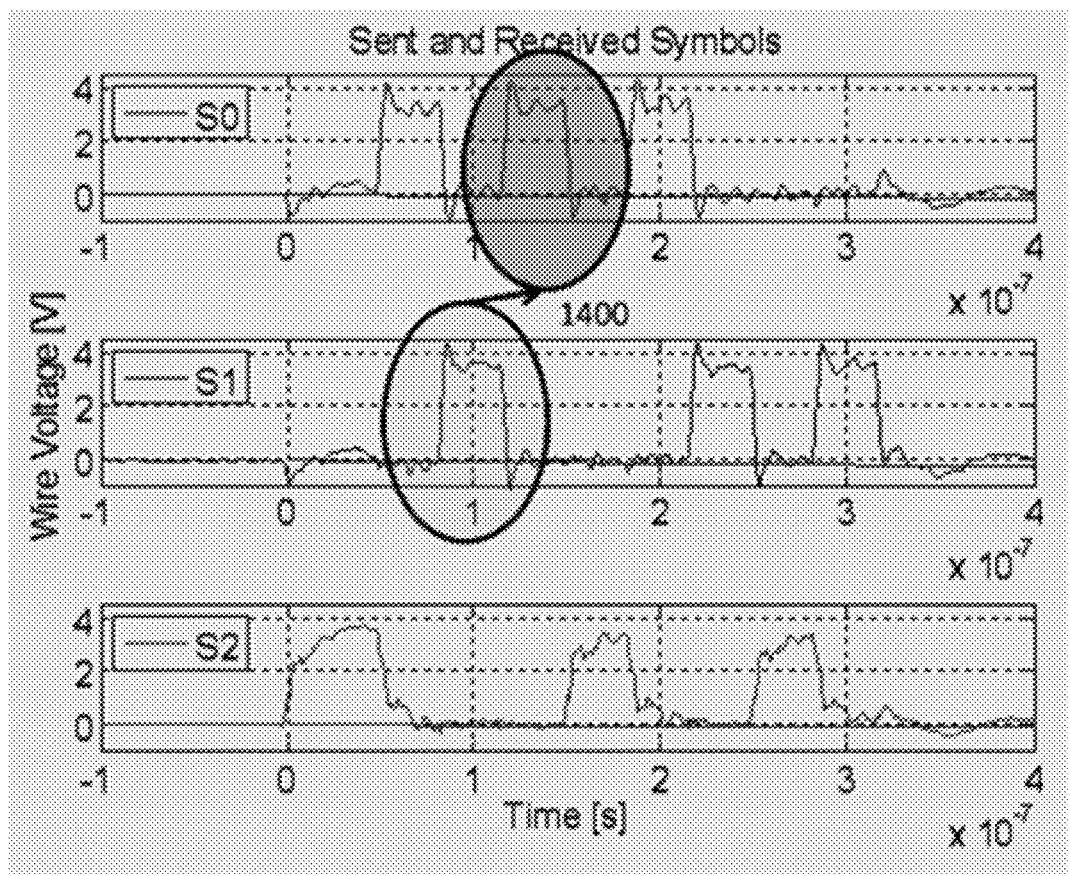
FIG. 14B is the series of graphs from FIG. 10 adapted to identify the fourth step, in accordance with some embodiments.

In FIGS. 14A and 14B (graph $S_0$), symbol $S_0$ is transceived (i.e., voltage on wire $W_1$ was reduced to zero, and voltage on wire $W_0$ was brought high). The transition 1400 from symbol $S_1$ to symbol $S_0$ indicates that a third bit of information has been sent and, according to the predetermined relationship between symbol $S_1$ and symbol $S_0$, the value of the third 1-bitcode word is "1," for a total bit string of "001."

Figure 15A:
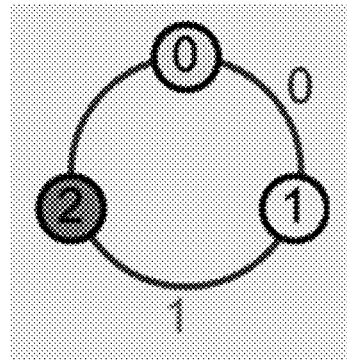
FIG. 15A is a diagram illustrating a fifth step in asynchronous communication.
Figure 15B:
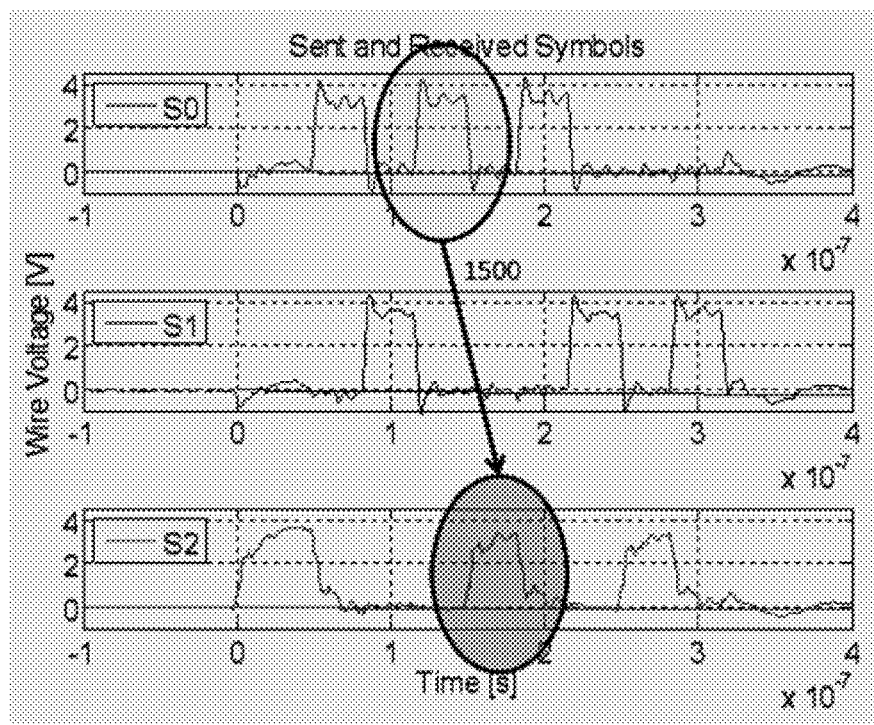
FIG. 15B is the series of graphs from FIG. 10 adapted to identify the fifth step, in accordance with some embodiments.

In FIGS. 15A and 15B (graph $S_2$), symbol $S_2$ is transceived (i.e., voltage on wire $W_0$ was reduced to zero, and voltage on wire $W_2$ was brought high). The transition 1500 from symbol $S_0$ to symbol $S_2$ indicates that a fourth bit of information has been sent and, according to the predetermined relationship between symbol $S_0$ and symbol $S_2$, the value of the fourth 1-bit code word is "1," for a total bit string of "0011."

Figure 16A:
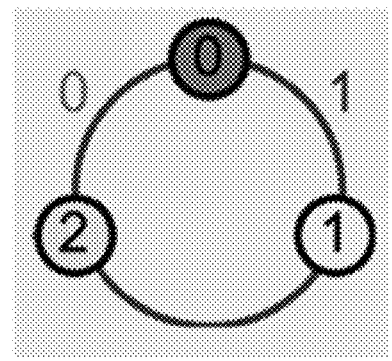
FIG. 16A is a diagram illustrating a sixth step in asynchronous communication.
Figure 16B:
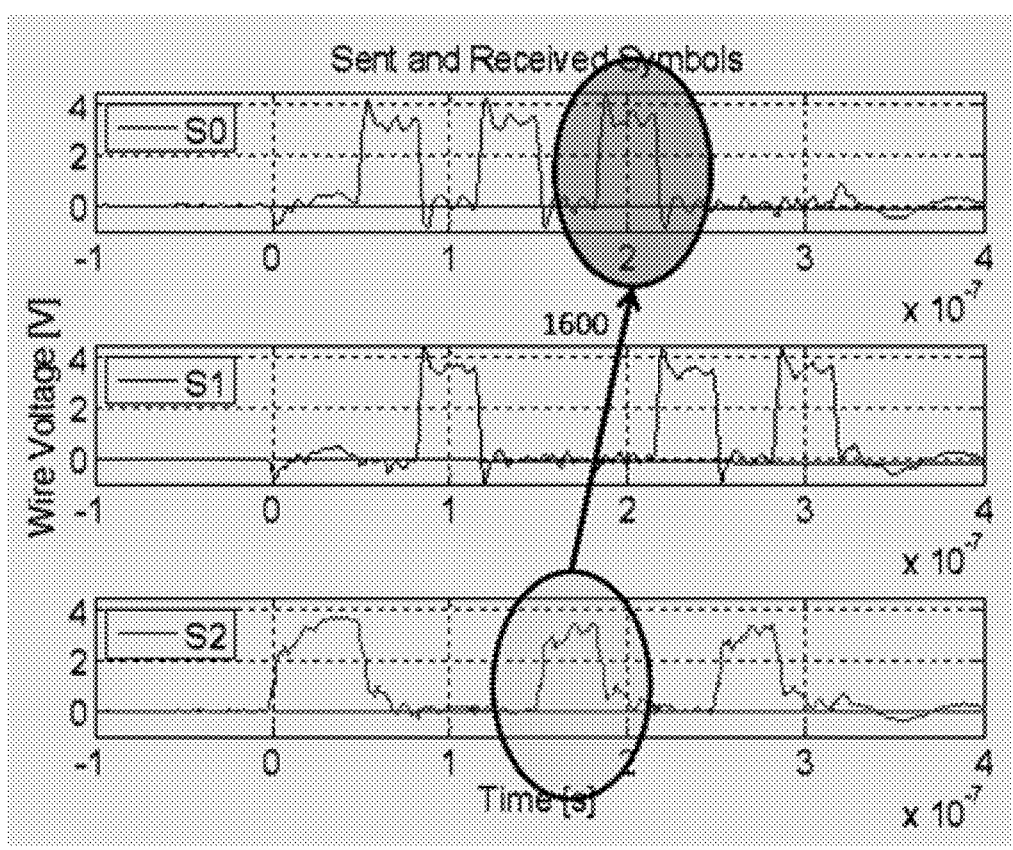
FIG. 16B is the series of graphs from FIG. 10 adapted to identify the sixth step, in accordance with some embodiments.

In FIGS. 16A and 16B (graph $S_0$), symbol $S_0$ is transceived (i.e., voltage on wire $W_2$ was reduced to zero, and voltage on wire $W_0$ was brought high). The transition 1600 from symbol $S_2$ to symbol $S_0$ indicates that a fifth bit of information has been sent and, according to the predetermined relationship between symbol $S_2$ and symbol $S_0$, the value of the fifth 1-bit code word is "0," for a total bit string of "00110."

Figure 17A:
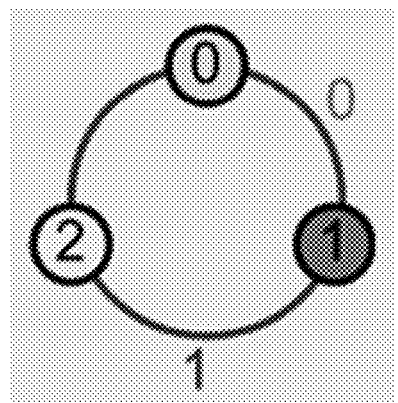
FIG. 17A is a diagram illustrating a seventh step in asynchronous communication.
Figure 17B:
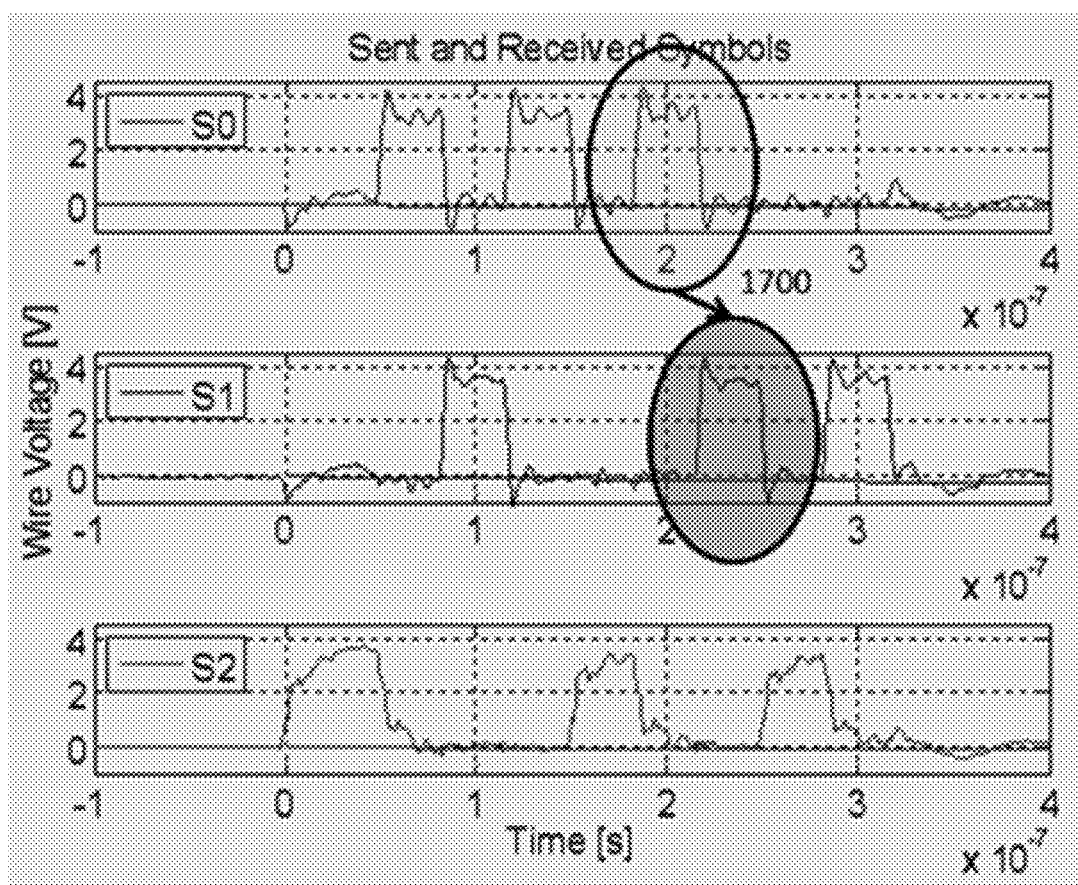
FIG. 17B is the series of graphs from FIG. 10 adapted to identify the seventh step, in accordance with some embodiments.

In FIGS. 17A and 17B (graph $S_1$), symbol $S_1$ is transceived (i.e., voltage on wire $W_0$ was reduced to zero, and voltage on wire $W_1$ was brought high). The transition 1700 from symbol $S_0$ to symbol $S_1$ indicates that a sixth bit of information has been sent and, according to the predetermined relationship between symbol $S_0$ and symbol $S_1$, the value of the sixth 1-bit code word is "0," for a total bit string of "001100."

Figure 18A:
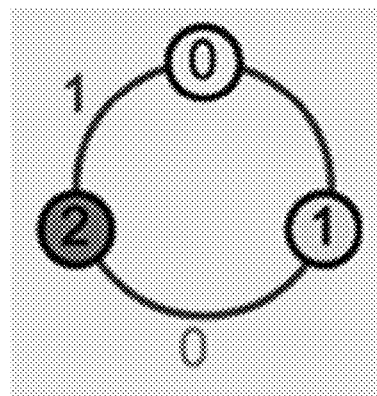
FIG. 18A is a diagram illustrating an eighth step in asynchronous communication.
Figure 18B:
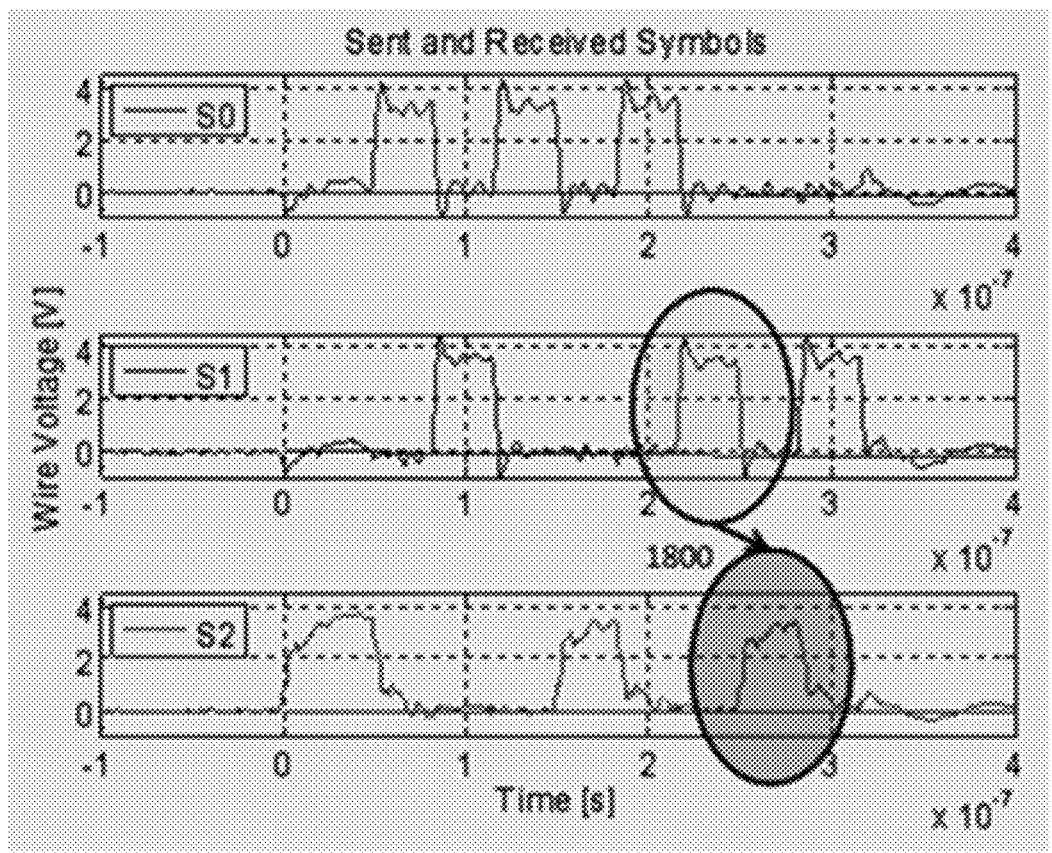
FIG. 18B is the series of graphs from FIG. 10 adapted to identify the eighth step, in accordance with some embodiments.

In FIGS. 18A and 18B (graph $S_2$), symbol $S_2$ is transceived (i.e., voltage on wire $W_1$ was reduced to zero, and voltage on wire $W_2$ was brought high). The transition 1800 from symbol $S_1$ to symbol $S_2$ indicates that a seventh bit of information has been sent and, according to the predetermined relationship between symbol $S_1$ and symbol $S_2$, the value of the seventh 1-bit code word is "0," for a total bit string of "0011000."

Figure 19A:
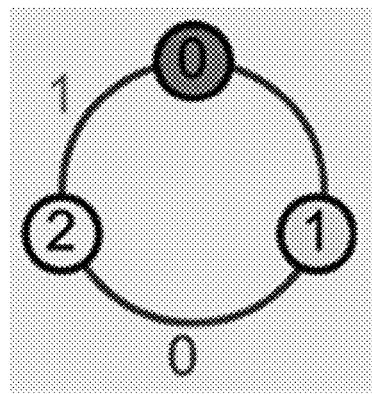
FIG. 19A is a diagram illustrating a ninth step in asynchronous communication.
Figure 19B:
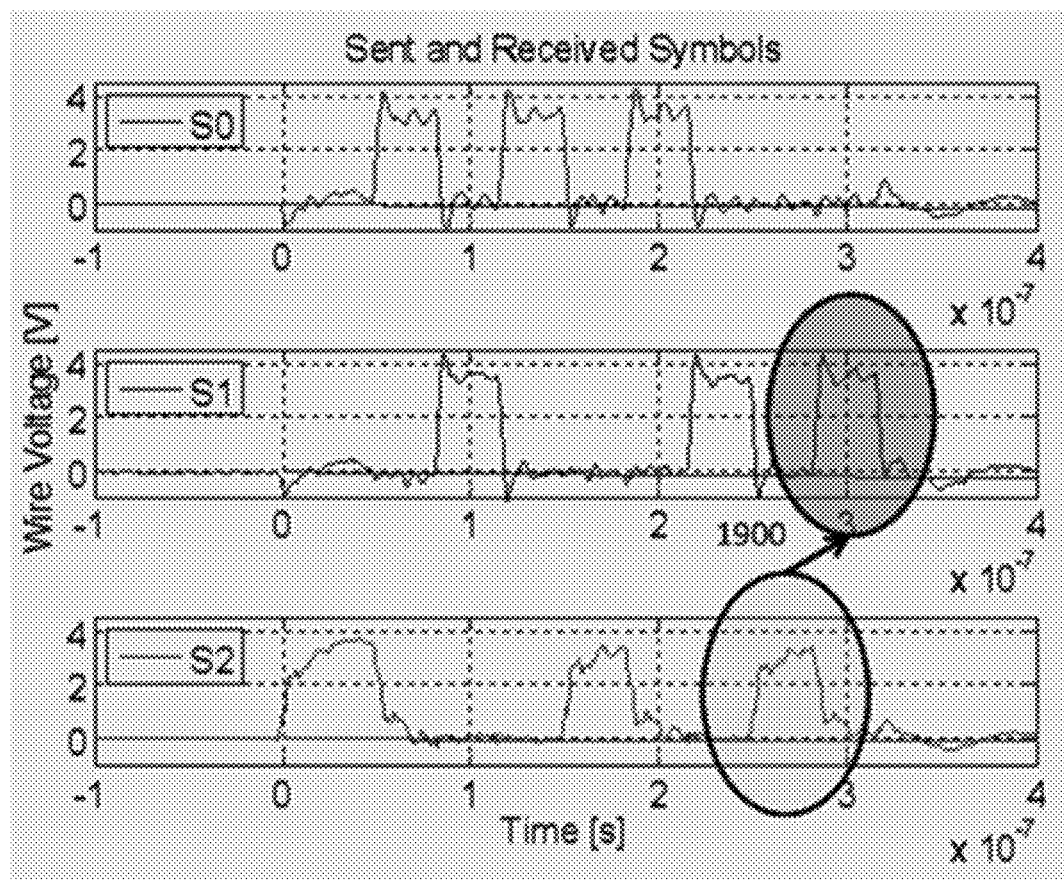
FIG. 19B is the series of graphs from FIG. 10 adapted to identify the sixth step, in accordance with some embodiments.

Finally, in FIGS. 19A and 19B (graph $S_1$), symbol $S_1$ is transceived (i.e., voltage on wire $W_2$ was reduced to zero, and voltage on wire $W_1$ was brought high). The transition 1900 from symbol $S_2$ to symbol $S_1$ indicates that a eighth bit of information has been sent and, according to the predetermined relationship between symbol $S_2$ and symbol $S_1$, the value of the eighth 1-bit code word is "1," for a total bit string of "00110001."

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments disclosed herein may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All publications, patent applications, patents, and other references mentioned herein are incorporated by reference in their entirety. In particular, the following sources are incorporated herein by reference in their entirety:
1. U.S. patent application Ser. No. 14/180,958, entitled "Buffered Body Return Receiver;" and
2. Devon Rosner, A High Speed Wearable System for Body Coupled Communication (Aug. 18, 2014) (unpublished M. Eng. thesis, Massachusetts Institute of Technology) (on file with inventors).

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of" or, when used in the claims, "consisting of" will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of" or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A communication device for asynchronously receiving and decoding information, the device comprising:
   at least one communication interface;
   at least one memory device for storing processor-executable instructions; and
   at least one processor communicatively coupled to the at least one communication interface and the at least one memory device, wherein upon execution of the processor-executable instructions by the at least one processor, the at least one processor:
      controls the at least one communication interface to receive a first symbol;
      compares the first symbol to a predetermined plurality of symbols;
      determines that, if the first symbol is included in the predetermined plurality symbols, the first symbol is valid;
      controls the at least one communication interface to receive a second symbol, the second symbol being different from the first symbol;
      compares the second symbol to the predetermined plurality of symbols;
      determines that, if the second symbol is included in the predetermined plurality of symbols, the second symbol is valid; and
      decodes digital data based on a predetermined relationship between the first symbol and the second symbol, wherein:
      the decoded digital data includes n bits; and
      the predetermined plurality of symbols includes at least $2^n+1$ symbols.

2. The device of claim 1, wherein at least one of:
   the digital data includes 1 bit, and the predetermined plurality of symbols includes 3 symbols;
   the digital data includes 2 bits, and the predetermined plurality of symbols includes 5 symbols;

the digital data includes 3 bits, and the predetermined plurality of symbols includes 9 symbols; and the digital data includes 4 bits, and the predetermined plurality of symbols includes 17 symbols.

3. A communication device for asynchronously receiving and decoding information, the device comprising:
- at least one communication interface;
- at least one memory device for storing processor-executable instructions; and
- at least one processor communicatively coupled to the at least one communication interface and the at least one memory device, wherein upon execution of the processor-executable instructions by the at least one processor, the at least one processor:
  - controls the at least one communication interface to receive a first symbol;
  - compares the first symbol to a predetermined plurality of symbols;
  - determines that, if the first symbol is included in the predetermined plurality symbols, the first symbol is valid;
  - controls the at least one communication interface to receive a second symbol, the second symbol being different from the first symbol;
  - compares the second symbol to the predetermined plurality of symbols;
  - determines that, if the second symbol is included in the predetermined plurality of symbols, the second symbol is valid; and
  - decodes digital data based on a predetermined relationship between the first symbol and the second symbol, wherein the decoded digital data is a code word associated with the predetermined relationship between the first symbol and the second symbol, the code word including n bits and being one of $2^n$ code words associated with the predetermined plurality of symbols.

4. A communication device for asynchronously receiving and decoding information, the device comprising:
- at least one communication interface;
- at least one memory device for storing processor-executable instructions; and
- at least one processor communicatively coupled to the at least one communication interface and the at least one memory device, wherein upon execution of the processor-executable instructions by the at least one processor, the at least one processor:
  - controls the at least one communication interface to receive a first symbol;
  - compares the first symbol to a predetermined plurality of symbols;
  - determines that, if the first symbol is included in the predetermined plurality symbols, the first symbol is valid;
  - controls the at least one communication interface to receive a second symbol, the second symbol being different from the first symbol;
  - compares the second symbol to the predetermined plurality of symbols;
  - determines that, if the second symbol is included in the predetermined plurality of symbols, the second symbol is valid; and
  - decodes digital data based on a predetermined relationship between the first symbol and the second symbol, wherein:
    - the predetermined plurality of symbols has a predefined arrangement and/or order;
    - each symbol of the predetermined plurality of symbols has a predefined position in the predefined arrangement and/or order; and
    - the predetermined relationship is predefined based on the predefined position of the second symbol relative to the predefined position of the first symbol in the predefined arrangement and/or order.

5. The device of claim 4, wherein:
- the predefined arrangement and/or order includes a closed shape;
- each symbol of the predetermined plurality of symbols has a unique predefined position on the closed shape; and
- the predetermined relationship is based on a number of symbols positioned between the predefined position of the first symbol and the predefined position of the second symbol upon traversal of the closed shape in a predefined direction from the predefined position of the first symbol to the predefined position of the second symbol.

6. A method for asynchronously receiving and decoding information, the method comprising:
- receiving, via at least one communication interface, a first symbol;
- comparing, via at least one processor, the first symbol to a predetermined plurality of symbols;
- determining that, if the first symbol is included in the predetermined plurality symbols, the first symbol is valid;
- receiving, via the at least one communication interface, a second symbol, the second symbol being different from the first symbol;
- comparing, via the at least one processor, the second symbol to the predetermined plurality of symbols;
- determining that, if the second symbol is included in the predetermined plurality of symbols, the second symbol is valid; and
- decoding, via the at least one processor, digital data based on a predetermined relationship between the first symbol and the second symbol, wherein:
  - the decoded digital data includes n bits; and
  - the predetermined plurality of symbols includes at least $2^n+1$ symbols.

7. The method of claim 6, wherein at least one of:
- the digital data includes 1 bit, and the predetermined plurality of symbols includes 3 symbols;
- the digital data includes 2 bits, and the predetermined plurality of symbols includes 5 symbols;
- the digital data includes 3 bits, and the predetermined plurality of symbols includes 9 symbols; and
- the digital data includes 4 bits, and the predetermined plurality of symbols includes 17 symbols.

8. The method of claim 6, wherein the decoded digital data is a code word associated with the predetermined relationship between the first symbol and the second symbol, the code word including n bits and being one of $2^n$ code words associated with the predetermined plurality of symbols.

9. The method of claim 6, wherein:
- the predetermined plurality of symbols has a predefined arrangement and/or order;
- each symbol of the predetermined plurality of symbols has a predefined position in the predefined arrangement and/or order; and the predetermined relationship is predefined based on the predefined position of the second symbol relative to the predefined position of the first symbol in the predefined arrangement and/or order.

10. The method of claim 9, wherein:
the predefined arrangement and/or order includes a closed shape;
each symbol of the predetermined plurality of symbols has a unique predefined position on the closed shape; and
the predetermined relationship is based on a number of symbols positioned between the predefined position of the first symbol and the predefined position of the second symbol upon traversal of the closed shape in a predefined direction from the predefined position of the first symbol to the predefined position of the second symbol.

11. A communication device for asynchronously encoding and transmitting information, the device comprising:
at least one communication interface;
at least one memory device for storing processor-executable instructions; and
at least one processor communicatively coupled to the at least one communication interface and the at least one memory device, wherein upon execution of the processor-executable instructions by the at least one processor, the at least one processor:
controls the at least one communication interface to transmit a first symbol from a predetermined plurality of symbols;
selects a second symbol from the predetermined plurality of symbols, the second symbol being different from the first symbol, to encode digital data based on a predetermined relationship between the first symbol and the second symbol; and
controls the at least one communication interface to transmit the second symbol from the predetermined plurality of symbols thereby encoding the digital data, wherein:
the digital data includes n bits; and
the predetermined plurality of symbols includes at least $2^n+1$ symbols.

12. The device of claim 11, wherein at least one of:
the digital data includes 1 bit, and the predetermined plurality of symbols includes 3 symbols;
the digital data includes 2 bits, and the predetermined plurality of symbols includes 5 symbols;
the digital data includes 3 bits, and the predetermined plurality of symbols includes 9 symbols; and
the digital data includes 4 bits, and the predetermined plurality of symbols includes 17 symbols.

13. The device of claim 11, wherein the digital data is a code word associated with the predetermined relationship between the first symbol and the second symbol, the code word including n bits and being one of $2^n$ code words associated with the predetermined plurality of symbols.

14. The device of claim 11, wherein:
the predetermined plurality of symbols has a predefined arrangement and/or order;
each symbol of the predetermined plurality of symbols has a predefined position in the predefined arrangement and/or order; and
the predetermined relationship is predefined based on the predefined position of the second symbol relative to the predefined position of the first symbol in the predefined arrangement and/or order.

15. The device of claim 14, wherein:
the predefined arrangement and/or order includes a closed shape;
each symbol of the predetermined plurality of symbols has a unique predefined position on the closed shape; and
the predetermined relationship is based on a number of symbols positioned between the predefined position of the first symbol and the predefined position of the second symbol upon traversal of the closed shape in a predefined direction from the predefined position of the first symbol to the predefined position of the second symbol.

16. A method for asynchronously encoding and transmitting information, the method comprising:
transmitting, via at least one communication interface, a first symbol from a predetermined plurality of symbols;
selecting a second symbol from the predetermined plurality of symbols, the second symbol being different from the first symbol, to encode digital data based on a predetermined relationship between the first symbol and the second symbol; and
transmitting, via the at least one communication interface, the second symbol from the predetermined plurality of symbols thereby encoding the digital data wherein:
the digital data includes n bits; and
the predetermined plurality of symbols includes at least $2^{n1}+1$ symbols.

17. The method of claim 16, wherein at least one of:
the digital data includes 1 bit, and the predetermined plurality of symbols includes 3 symbols;
the digital data includes 2 bits, and the predetermined plurality of symbols includes 5 symbols;
the digital data includes 3 bits, and the predetermined plurality of symbols includes 9 symbols; and
the digital data includes 4 bits, and the predetermined plurality of symbols includes 17 symbols.

18. The method of claim 16, wherein the digital data is a code word associated with the predetermined relationship between the first symbol and the second symbol, the code word including n bits and being one of $2^n$ code words associated with the predetermined plurality of symbols.

19. The method of claim 16, wherein:
the predetermined plurality of symbols has a predefined arrangement and/or order;
each symbol of the predetermined plurality of symbols has a predefined position in the predefined arrangement and/or order; and
the predetermined relationship is predefined based on the predefined position of the second symbol relative to the predefined position of the first symbol in the predefined arrangement and/or order.

20. The method of claim 19, wherein:
the predefined arrangement and/or order includes a closed shape;
each symbol of the predetermined plurality of symbols has a unique predefined position on the closed shape; and
the predetermined relationship is based on a number of symbols positioned between the predefined position of the first symbol and the predefined position of the second symbol upon traversal of the closed shape in a predefined direction from the predefined position of the first symbol to the predefined position of the second symbol.

* * * * *

UNITED STATES PATENT AND TRADEMARK OFFICE
CERTIFICATE OF CORRECTION

PATENT NO. : 9,749,164 B2
APPLICATION NO. : 15/327352
DATED : August 29, 2017
INVENTOR(S) : Grant Seaman Anderson et al.

It is certified that error appears in the above-identified patent and that said Letters Patent is hereby corrected as shown below:

On the Title Page

Item (87), PCT Pub. No.:
"PCT Pub. No.: WO2013/014853"
Should read:
-- PCT Pub. No.: WO2016/014853 --

In the Claims

At Column 20, Line number 28:
"$2^{n1}+1$ symbols."
Should read:
-- $2^n+1$ symbols. --

Signed and Sealed this
Tenth Day of April, 2018

Andrei Iancu
*Director of the United States Patent and Trademark Office*